US008113954B2

(12) United States Patent         (10) Patent No.:     US 8,113,954 B2
    Kasamatsu et al.              (45) Date of Patent:     Feb. 14, 2012

(54) GAME APPARATUS, STORAGE MEDIUM STORING GAME PROGRAM AND GAME CONTROLLING METHOD FOR TOUCH INPUT MONITORING

(75) Inventors: Shigehiro Kasamatsu, Kyoto (JP); Shigeru Miyamoto, Kyoto (JP); Shinichi Ikematsu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1490 days.

(21) Appl. No.: 11/240,770

(22) Filed: Oct. 3, 2005

(65) Prior Publication Data

US 2006/0073899 A1    Apr. 6, 2006

(30) Foreign Application Priority Data

Oct. 6, 2004   (JP) ................................. 2004-293595

(51) Int. Cl.
    *A63F 13/00*    (2006.01)
(52) U.S. Cl. ........... 463/37; 715/702; 715/856; 715/862
(58) Field of Classification Search .................... 463/37; 715/702, 856, 862
    See application file for complete search history.

(56) References Cited

U.S. PATENT DOCUMENTS 4,661,810 A * 4/1987 Himelstein et al. ........... 715/860
5,627,567 A * 5/1997 Davidson ...................... 345/173
5,757,358 A * 5/1998 Osga ............................. 715/862
6,259,436 B1 * 7/2001 Moon et al. .................... 345/173
6,466,197 B1 * 10/2002 Kim et al. ...................... 345/156
6,567,070 B1 * 5/2003 Light et al. .................... 345/157
6,567,109 B1 * 5/2003 Todd ............................. 715/862
6,717,600 B2 * 4/2004 Dutta et al. .................... 715/862
6,780,112 B2 * 8/2004 Kikukawa et al. ............. 463/33
6,795,059 B2 * 9/2004 Endo .............................. 345/173
6,959,423 B2 * 10/2005 Bosma et al. .................. 715/845

FOREIGN PATENT DOCUMENTS

JP          11-053093        2/1999
* cited by examiner

Primary Examiner — Dmitry Suhol
Assistant Examiner — David Duffy
(74) Attorney, Agent, or Firm — Nixon & Vanderhye P.C.

(57) ABSTRACT

The game apparatus includes a first LCD and a second LCD, and a touch panel is provided in association with the second LCD. On the two LCDs, different game screens are displayed. Also on the second LCD, two keys are displayed at a certain interval. When one key is touch-input, the key is set to an effective state to change the game screens of the two LCDs on the basis of the key, and when the other key is touch-input, the game screens of the two LCDs are changed on the basis of the key. When a player performs a touch-input on any one of the keys, and then performs a drag operation so as to point a middle area between the two keys, the game screens of the two LCDs are changed on the basis of the key that is set to the effective state.

18 Claims, 15 Drawing Sheets

☒☒☒ ... OPERATION EFFECTIVE AREA OF LEFT KEY

▨▨▨ ... OPERATION EFFECTIVE AREA OF RIGHT KEY

▦▦▦ ... MIDDLE AREA BETWEEN LEFT KEY AND RIGHT KEY

GAME APPARATUS, STORAGE MEDIUM STORING GAME PROGRAM AND GAME CONTROLLING METHOD FOR TOUCH INPUT MONITORING

BACKGROUND

1. Field of the Technology

The present technology relates to a game apparatus, a storage medium storing a game program, and a game controlling method. More specifically, the present technology relates to a game apparatus, a storage medium storing a game program, and a game controlling method that have a display portion for displaying at least a first key, a second key, a game image, and a touch panel provided in association with the display portion.

2. Description of the Prior Art

In an electronic appliance such as a PDA capable of performing an operation input by use of a touch panel, it is common practice to prevent an erroneous operation by providing an interval (boundary areas) to some extent between designs (operation effective area) of adjacent operation keys.

For example, one example of this kind of a conventional game apparatus is disclosed in a Japanese Patent Laying-open No. 11-53093 [G06F 3/023, H03M 11/04, G06F 3/02] laid-open on Feb. 26, 1999. According to the prior art, boundary areas each having a predetermined width between the respective keys to be displayed on an input area is set, and according to a condition of an input error by the operator, a boundary area is set to an area belonging to either of the keys sandwiching the boundary area. Then, when the boundary area is selected, it is determined to which key the boundary area belongs to, and whereby, an input assigned to the determined key can be performed. Thus, it is possible to lessen an erroneous input.

However, the prior art is advantageous to input a character, etc. to an input device on which a key arrangement such as a keyboard is displayed, but is not advantageous to be applied to the game apparatus. For example, should the prior art applied to the game apparatus, it is impossible to determine which operation is an erroneous operation and it is not clear which boundary area belongs to which key during the game.

Therefore, when no key is assigned to the boundary area, in a case that a continuous (combined) operation of the adjacent two keys is performed according to a slide (drag) of fingers and a pen (stylus pen) on the touch-panel, a no-input state provisionally occurs when the boundary area of the two keys is pointed. That is, it is determined that each of the keys is separately operated. Consequently, it is impossible to perform an operation peculiar to a game such as inputting a specific command by operating the key in a combined manner.

SUMMARY

Therefore, it is a primary feature of an exemplary embodiment presented herein to provide a novel game apparatus, storage medium storing a game program, and game controlling method.

Another feature of an exemplary embodiment presented herein is to provide a game apparatus, a storage medium storing a game program, and a game controlling method that allow an operation peculiar to a game.

A game apparatus according to an exemplary embodiment has a display portion for displaying a game image including at least a first key and a second key and a touch panel provided in association with the display portion. The game apparatus comprises an operation state detecting means, a coordinate position detecting means, a first pointing state determining means, a game processing means, and a second pointing state determining means. The operation state detecting means detects presence or absence of an operation input to the touch panel every predetermined time. The coordinate position detecting means detects a coordinate position when a presence of the operation input to the touch panel is detected by the operation state detecting means. The first pointing state determining means determines whether the coordinate position detected by the coordinate position detecting means is included in a first operation effective area of the first key or a second operation effective area of the second key when it is detected that the operation input to the touch panel is shifted from an operation-absent state to an operation-present state by the operation state detecting means. The game processing means changes the game image on the basis of the first key when it is determined that the coordinate position is included in the first operation effective area by the first pointing state determining means, and changes the game image on the basis of the second key when it is determined that the coordinate position is included in the second operation effective area. The second pointing state determining means determines whether or not the coordinate position detected by the coordinate position detecting means is moved to the middle area between the first operation effective area and the second operation effective area after it is determined that the coordinate position is included in any one of the first operation effective area and the second operation effective area by the first pointing state determining means, and while the operation-input-present state to the touch panel is continuously detected by the operation state detecting means. The game processing means changes the game image on the basis of a determination result of the first pointing state determining means when it is determined that the coordinate position is moved to the middle area by the second pointing state determining means.

More specifically, the game apparatus (10: a reference numeral corresponding in the "detailed description of the preferred embodiments" described later and so forth) has the display (14 (LCD 12 is also provided in the detailed description of preferred embodiments)) for displaying the game image (110) including at least the first key (112a) and the second key (112b) and the touch panel (22) provided in association with the display. In the game apparatus, the operation state detecting means (42, S3) detects the presence or absence of an operation input to the touch panel every predetermined time. In a case that the coordinate data is input from the touch panel, it is determined that an operation input is present, and in a case that the coordinate data is not input, it is determined that an operation input is absent. The coordinate position detecting means (42, S7, S31) detects the coordinate position when a presence of the operation input to the touch panel is detected by the operation state detecting means. More specifically, it is detected that which area of the display the touch input by the player points. The first pointing state determining means (42, S5, S9, S17) determines whether the coordinate position detected by the coordinate position detecting means is included in the first operation effective area (114a) of the first key or the second operation effective area (114b) of the second key when it is detected that the operation input to the touch panel is shifted from the operation-absent state to the operation-present state by the operation state detecting means ("YES" in S5). The game processing means (42, S13, S15, S21, S23, S37, S39, S43, S45, S59, S61, S71, S73) changes the game image on the basis of the first key when it is determined that the coordinate position is included in the first operation effective area by the first pointing state determining means ("YES" in S9). Furthermore, the game processing means changes the game image on the basis of the second key when it is determined that the coordinate position is included in the second operation effective area by the first pointing state determining means ("YES" in S17). The second pointing state determining means (42, S33, S51, S55, S63, S67) determines whether or not the coordinate position detected by the coordinate position detecting means is moved to the middle area between the first operation effective area and the second operation effective area after it is determined that the coordinate position is included in any one of the first operation effective area and the second operation effective area by the first pointing state determining means ("YES" in S9, S17), and while the operation-input-present state to the touch panel is continuously detected by the operation state detecting means ("YES" in S29). That is, it is determined whether or not the player operates the first key or the second key, and then, drags so as to point the area between the two keys. The game processing means changes the game image on the basis of the determination result by the second pointing state determining means. For example, the game processing means changes the game image on the basis of the first key in a case that the player operates the first key and then performs a drag operation so as to point the middle area. Furthermore, the game processing means changes the game image on the basis of the second key in a case that the player operates the second key, and then performs the drag operation so as to point the middle area by the drag operation.

According to an exemplary embodiment, in a case that the player separately operates the first key and the second key, the game image is changed on the basis of each of the keys. In a case that the player operates the first key or the second key, and then, performs a drag operation to point the area between the two keys, the game image is changed on the basis of the key operated at first. Thus, it is possible to perform a continuous operation in a case that the player performs a drag operation from the first key to the second key via the middle area, and the vice versa. That is, it is possible to perform an operation peculiar to the game such as separately operating the two keys, and operating the two keys in a combined manner.

In one aspect of an exemplary embodiment, the game apparatus further includes a key effective state setting means for setting the first key to an effective state when it is determined the coordinate position is included in the first operation effective area by the first pointing state determining means, and setting the second key to the effective state when it is determined that the coordinate position is included in the second operation effective area; wherein the game processing means changes the game image on the basis of the first key or the second key that is set to the effective state by the key effective state setting means. More specifically, the key effective state setting means (42, S11, S19) sets the first key to the effective state when it is determined that the coordinate position is included in the first operation effective area by the first pointing state determining means ("YES" in S9), and sets the second key to the effective state when it is determined that the coordinate position is included in the second operation effective area by the first pointing state determining means ("YES" in S17). The game processing means changes the game image on the basis of the first key or the second key that is set to the effective state. Thus, the game image is changed on the basis of the key that is set to the effective state, and therefore, once that the key is set to the effective state, even if the middle area is pointed, the game image can be changed on the basis of the key that is set to the effective state.

In one exemplary embodiment, the second pointing state determining means determines, after it is determined that the coordinate position is included in one of the first operation effective area and the second operation effective area by the first pointing state determining means and while the operation-input-present state to the touch panel is continuously detected by the operation state detecting means, whether or not the coordinate position detected by the coordinate position detecting means is moved to the other of the first operation effective area and the second operation effective area, and the key effective state setting means sets, when it is determined that the coordinate position is moved to the other of the first operation effective area and the second operation effective area by the second pointing state determining means, the key corresponding to the other to the effective state. More specifically, the second pointing state determining means determines, after it is determined that the coordinate position is included in one of the first operation effective area and the second operation effective area by the first pointing state determining means and while the operation-input-present state to the touch panel is continuously detected by the operation state detecting means, whether or not the coordinate position detected by the coordinate position detecting means is moved to the other of the first operation effective area and the second operation effective area (S55, S67). The key effective state setting means, when it is determined that the coordinate position is moved to the other of the first operation effective area and the second operation effective area by the second pointing state determining means ("YES" in S55, S67), that is, the other key is pointed by the drag operation, sets the key corresponding to the other key to the effective state. Accordingly, when the player inputs the first key at a start of the operation input, and then, performs a drag operation so as to input the second key, the second key is set to the effective state while when the player inputs the second key at a start of the operation input, and then performs a drag operation so as to input the first key, the first key is set to the effective state.

In another exemplary embodiment of a game apparatus in which the second pointing state determining means determines, after it is determined that the coordinate position is included in one of the first operation effective area and the second operation effective area by the first pointing state determining means and while the operation-input-present state to the touch panel is continuously detected by the operation state detecting means, whether or not the coordinate position detected by the coordinate position detecting means is moved outside the first operation effective area, the second operation effective area, and the middle area, and further comprising an effective state setting canceling means for canceling the setting of the effective state to the key by the key effective state setting means when it is determined that the coordinate position is moved outside the first operation effective area, the second operation effective area, and the middle area by the second pointing state determining means, wherein the game processing step does not change the game image when the effective state setting to the key is canceled by the effective state setting canceling means. More specifically, the second pointing state determining means determines, after it is determined that the coordinate position is included in one of the first operation effective area and the second operation effective area by the first pointing state determining means and while the operation input present state to the touch panel is continuously detected by the operation state detecting means, whether or not the coordinate position detected by the coordinate position detecting means is moved outside the first operation effective area, the second operation effective area, and the middle area (S33, S51, S63). The effective state setting canceling means (42, S49, S75) cancels the effective state setting to the key by the key effective state setting means when it is determined that the coordinate position is moved outside the first operation effective area, the second operation effective area, and the middle area ("NO" in each of S33, S51, S63). The game processing means does not change the game image when the effective state setting to the key is canceled. Accordingly, after the first key and the second key are operated and when the area except for the first key, the second key and the middle area between the two keys is pointed, it is possible to cancel the effective state setting.

In another exemplary embodiment, the effective state setting canceling means cancels the effective state setting to the key by the key effective state setting means after it is determined that the coordinate position is included in one of the first operation effective area and the second operation effective area by the first pointing state determining means, and when it is detected that the operation input to the touch panel is shifted from the operation-present state to the operation-absent state by the operation state detecting means. More specifically, the effective state setting canceling means cancels the effective state setting to the key by the key effective state setting means after it is determined that the coordinate position is included in one of the first operation effective area and the second operation effective area by the first pointing state determining means, and when it is detected that the operation input to the touch panel is shifted from the operation-present state to the operation-absent state by the operation state detecting means ("YES" in S47). Accordingly, it is possible to cancel the effective state setting at the end of the operation input.

In another aspect of an exemplary embodiment, the display portion includes a first display area for displaying a first game image and second display area for displaying a second game image including the first key and the second key, and the game processing means changes both of the first game image and the second game image. More specifically, the display portion includes the first display area (12) and the second display area (14). The first display area (12) displays the first game image, and the second display area (14) displays the second game image including the first key and the second key. The game processing means changes the both of the first game image and the second game image on the basis of the first key or the second key. Accordingly, it is possible to change the two game images respectively displayed on the two display areas on the basis of the first key or the second key.

A storage medium storing a game program according to an exemplary embodiment stores a game program of a game apparatus having a display portion for displaying a game image including at least a first key and a second key and a touch panel provided in association with the display portion. The game program causes a processor of the game apparatus to execute an operation state detecting step, a coordinate position detecting step, a first pointing state determining step, a game processing step, and a second pointing state determining step. The operation state detecting step detects presence or absence of an operation input to the touch panel every predetermined time. The coordinate position detecting step detects a coordinate position when a presence of the operation input to the touch panel is detected by the operation state detecting step. The first pointing state determining step determines whether the coordinate position detected by the coordinate position detecting step is included in a first operation effective area of the first key or a second operation effective area of the second key when it is detected that the operation input to the touch panel is shifted from an operation-absent state to an operation-present state by the operation state detecting step. The game processing step changes the game image on the basis of the first key when it is determined that the coordinate position is included in the first operation effective area by the first pointing state determining step, and changes the game image on the basis of the second key when it is determined that the coordinate position is included in the second operation effective area. The second pointing state determining step determines whether or not the coordinate position detected by the coordinate position detecting step is moved to the middle area between the first operation effective area and the second operation effective area after it is determined that the coordinate position is included in any one of the first operation effective area and the second operation effective area by the first pointing state determining step, and while the operation-input-present state to the touch panel is continuously detected by the operation state detecting step. The game processing step changes the game image on the basis of a determination result of the first pointing state determining step when it is determined that the coordinate position is moved to the middle area by the second pointing state determining step.

In an exemplary embodiment of the storage medium storing a game program also, it is possible to perform an operation peculiar to the game similar to the exemplary embodiment of the game apparatus.

A game controlling method according to an exemplary embodiment is a game controlling method of a game apparatus having a display portion for displaying a game image including at least a first key and a second key and a touch panel provided in association with the display portion, comprises following steps of: (a) detecting presence or absence of an operation input to the touch panel every predetermined time, (b) detecting a coordinate position when a presence of the operation input to the touch panel is detected by the step (a); (c) determining whether the coordinate position detected by the step (b) is included in a first operation effective area of the first key or a second operation effective area of the second key when it is detected that an operation input to the touch panel is shifted from an operation-absent state to an operation-present state by the step (a); (d) changing the game image on the basis of the first key when it is determined that the coordinate position is included in the first operation effective area by the step (c), and changing the game image on the basis of the second key when it is determined that the coordinate position is included in the second operation effective area; and (e) determining whether or not the coordinate position detected by the step (b) is moved to the middle area between the first operation effective area and the second operation effective area after it is determined that the coordinate position is included in any one of the first operation effective area and the second operation effective area by the step (c), and while the operation-input-present state to the touch panel is continuously detected by the step (a); wherein, the step (d) changes the game image on the basis of a determination result by the step (c) when it is determined that the coordinate position is moved to the middle area by the step (e).

In an exemplary embodiment of the game controlling method also, it is possible to perform an operation peculiar to the game similar to the exemplary embodiment of the game apparatus.

The above described features, aspects and advantages of the exemplary embodiment presented herein will become more apparent from the following detailed description when taken in conjunction with the accompanying drawings.

DETAILED DESCRIPTION OF THE PREFERRED EMBODIMENTS

Figure 1:
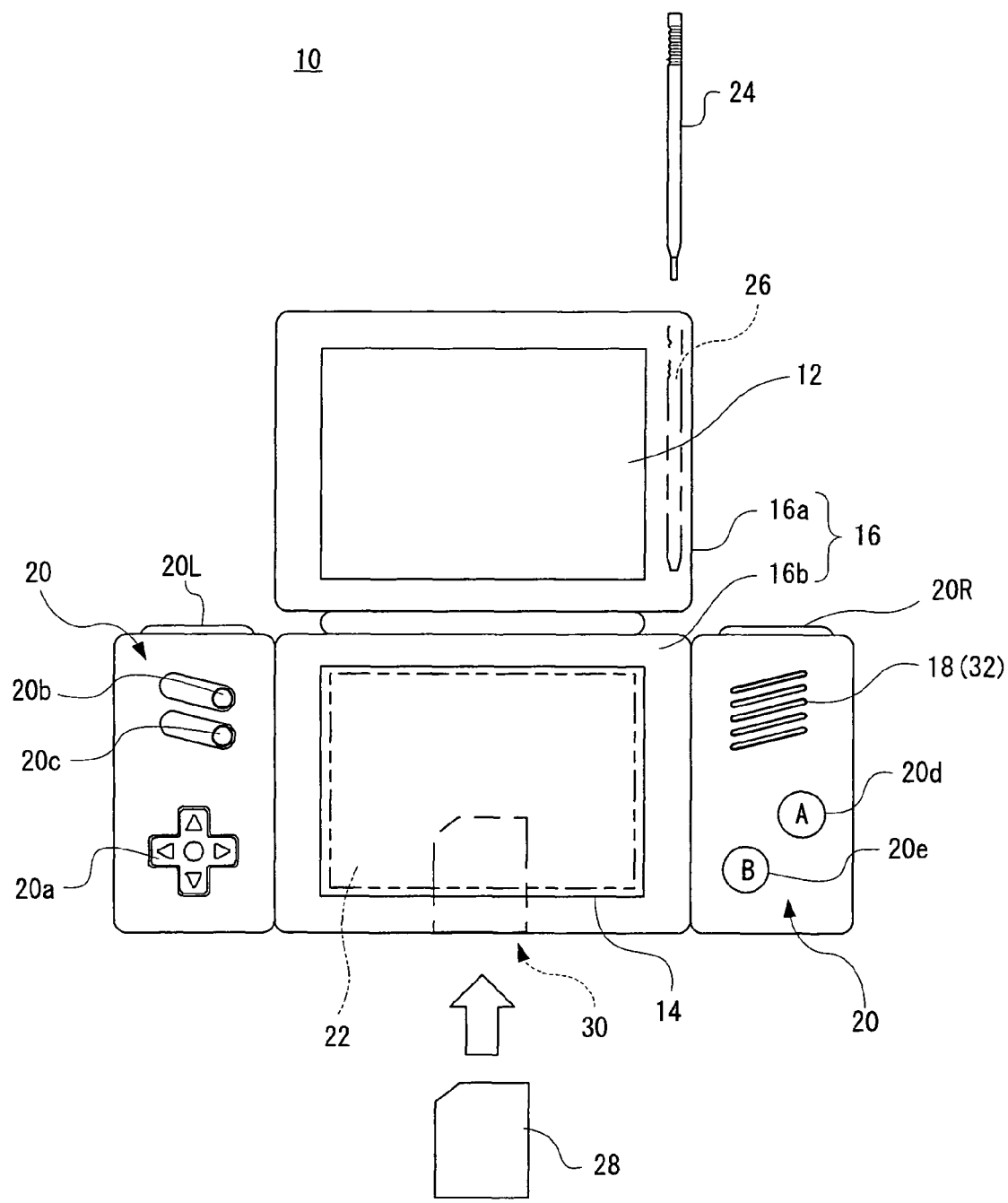
FIG. 1 is an illustrative view showing one example of a game apparatus according to an exemplary embodiment.

Referring to FIG. 1, a game apparatus 10 of one embodiment includes a first liquid crystal display (LCD) 12 and a second LCD 14. The LCD 12 and the LCD 14 are provided on a housing 16 so as to be arranged in a predetermined position. In this embodiment, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound release hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to fold such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating at least any one of four depression portions. The start switch 20b is formed by a push button, and is utilized for starting (restarting), temporarily stopping (pausing) a game, and so forth. The select switch 20c is formed by the push button, and utilized for a game mode selection, etc.

The action switch 20d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch 20L (left depression button) and the action switch 20R (right depression button) are formed by the push button, and the left depression button (L button) 20L and right depression button (the R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of a resistance film system, an optical system (infrared rays system) and an electrostatic capacitive coupling system, for example, can be utilized. When being operated by depressing, stroking, touching, and so forth (hereinafter, referred to as depressing) with a stick 24, a pen (stylus pen), or a finger (hereinafter, referred to as "stick 24, etc.") on a top surface thereof, the touch panel 22 detects coordinates of the operated position by the stick 24, etc., and outputs coordinate data corresponding to the detected coordinates.

It is noted that in this embodiment, a resolution of the display surface of the LCD 14 is 256 dots×192 dots (this is true or roughly true for the LCD 12), and a detection accuracy of the touch panel 22 is also rendered 256 dots×192 dots in correspondence to the resolution of the display surface. It is noted that detection accuracy of the touch panel 22 may be lower than the resolution of the display surface, or higher than it.

Display screens like different game image (game screens), may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD 12 in this embodiment), and a game screen (operation screen) including an image such as textual information, an icon, etc. for operating the game may be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point a character image such as a player character, an enemy character, an item character, texture information, an icon, etc. to be displayed on the LCD 14 and select commands by operating the touch panel 22 with the use of the stick 24, etc. Furthermore, it is possible to change the direction of the virtual camera (view point) provided in the three-dimensional game space, and instruct a scrolling (gradual moving display) direction of the game screen (map).

It is noted that depending on the kind of the game, the player is able to use the LCD 14 for another various input instructions, such as selecting or operating the icon displayed on the LCD 14, instructing a coordinate input, and so forth.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (12, 14) and the operating portions (20, 22) of two systems.

Furthermore, in this embodiment, the stick 24 can be inserted into a housing portion (housing slot) 26 provided in proximity to a side surface (right side surface) of the upper housing 16a, for example, and taken out therefrom as necessary. It is noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound release hole 18 inside the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
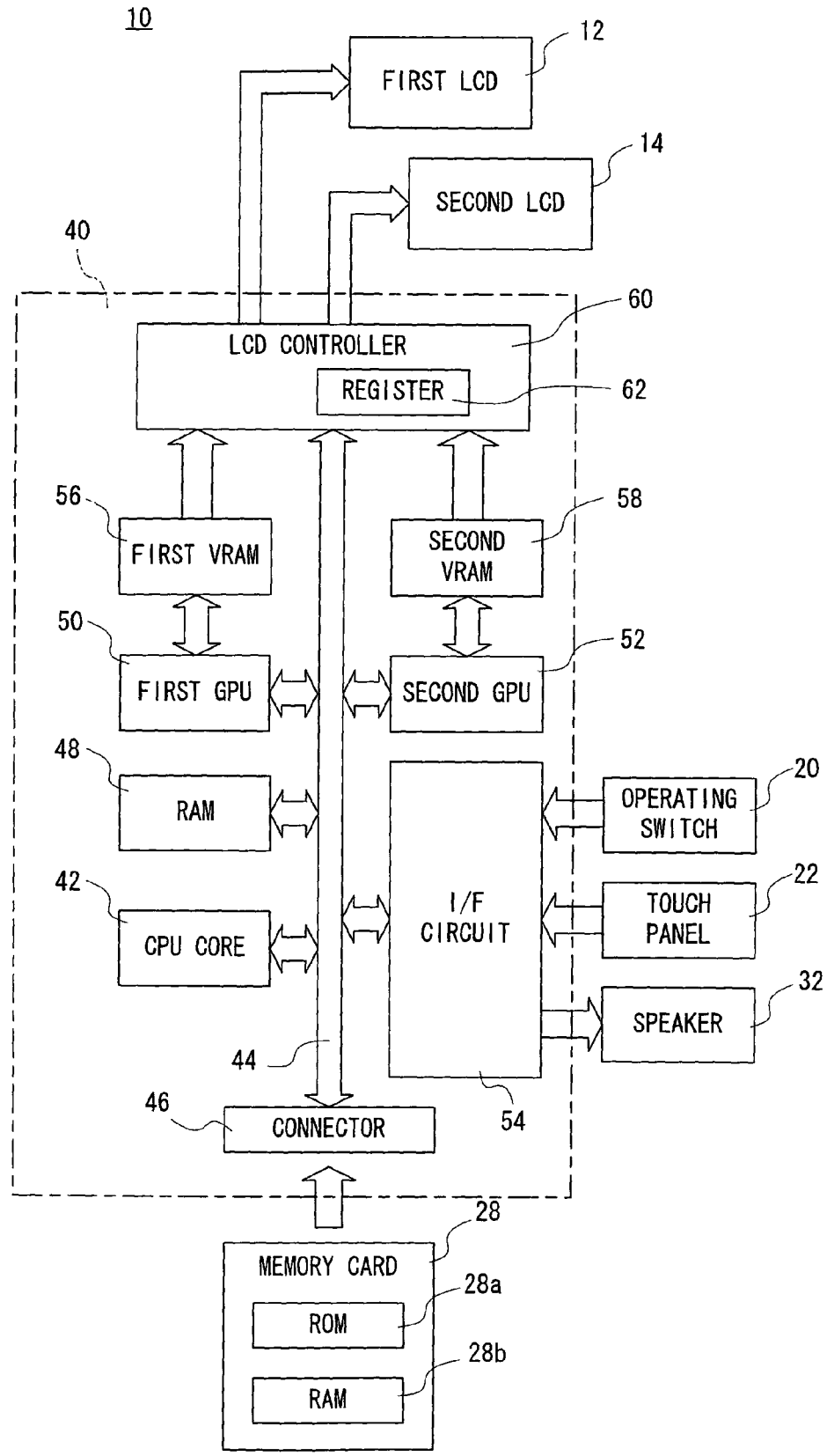
FIG. 2 is a block diagram showing an electronic configuration of the game apparatus shown in FIG. 1.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, and an input-output interface circuit (hereinafter, referred to as "I/F circuit") 54, an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, background image, item image, icon (button) image, message image, cursor image etc.), data of the sound (music) necessary for the game (sound data), etc. The RAM (backup RAM) 28b stores (saves) proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes a process according to the loaded game program. The CPU core 42 executes a game process while storing in the RAM 48 data (game data, flag data, etc.) temporarily generated in correspondence with a progress of the game.

It is noted that the game program, the image data, the sound data, etc. are loaded from the ROM 28a entirely at a time, or partially and sequentially as necessary so as to be stored (loaded) into the RAM 48.

It is noted that a program as to an application except for the game and image data required to execute the application are stored in the ROM 28a of the memory card 28. In addition, sound (music) data may be stored therein as necessary. In such a case, in the game apparatus 10, the application is executed.

Each of the GPU 50 and the GPU 52 forms a part of a rendering means, is constructed by, for example, a single chip ASIC, and receives a graphics command (construction command) from the CPU core 42 to generate game image data according to the graphics command. It is noted that the CPU core 42 applies to each of the GPU 50 and the GPU 52 an image generating program (included in the game program) required to generate the game image data in addition to the graphics command.

Furthermore, the GPU 50 is connected with a first video RAM (hereinafter, referred to as "VRAM") 56, and the GPU 52 is connected with a second VRAM 58. The GPU 50 and the GPU 52 gains access to the first VRAM 56 and the second VRAM 58 to fetch data (image data: data such as character data, texture, etc.) required to execute the construction command. It is noted that the CPU core 42 writes the image data required for rendering to the first VRAM 56 and the second VRAM 58 through the GPU 50 and the GPU 52. The GPU 50 accesses the VRAM 56 to create the game image data for rendering, and the GPU 52 accesses the VRAM 58 to create the game image data for rendering.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data created by the GPU 50 to the LCD 12, and outputs the game image data rendered by the GPU 52 to the LCD 14 in a case that the data value of the register 62 is "0". On the other hand, the LCD controller 60 outputs the game image data created by the GPU 50 to the LCD 14, and outputs the game image data rendered by the GPU 52 to the LCD 12 in a case that the data value of the register 62 is "1".

It is noted that the LCD controller 60 can directly read the game image data from the VRAM 56 and the VRAM 58, or read the game image data from the VRAM 56 and the VRAM 58 via the GPU 50 and the GPU 52.

Hereinafter, for simplicity, a description is made on the data value of the register 62 is set to "0".

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, coordinate data from the touch panel 22 is input to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs it from the speaker 32 via the I/F circuit 54.

Figure 3:
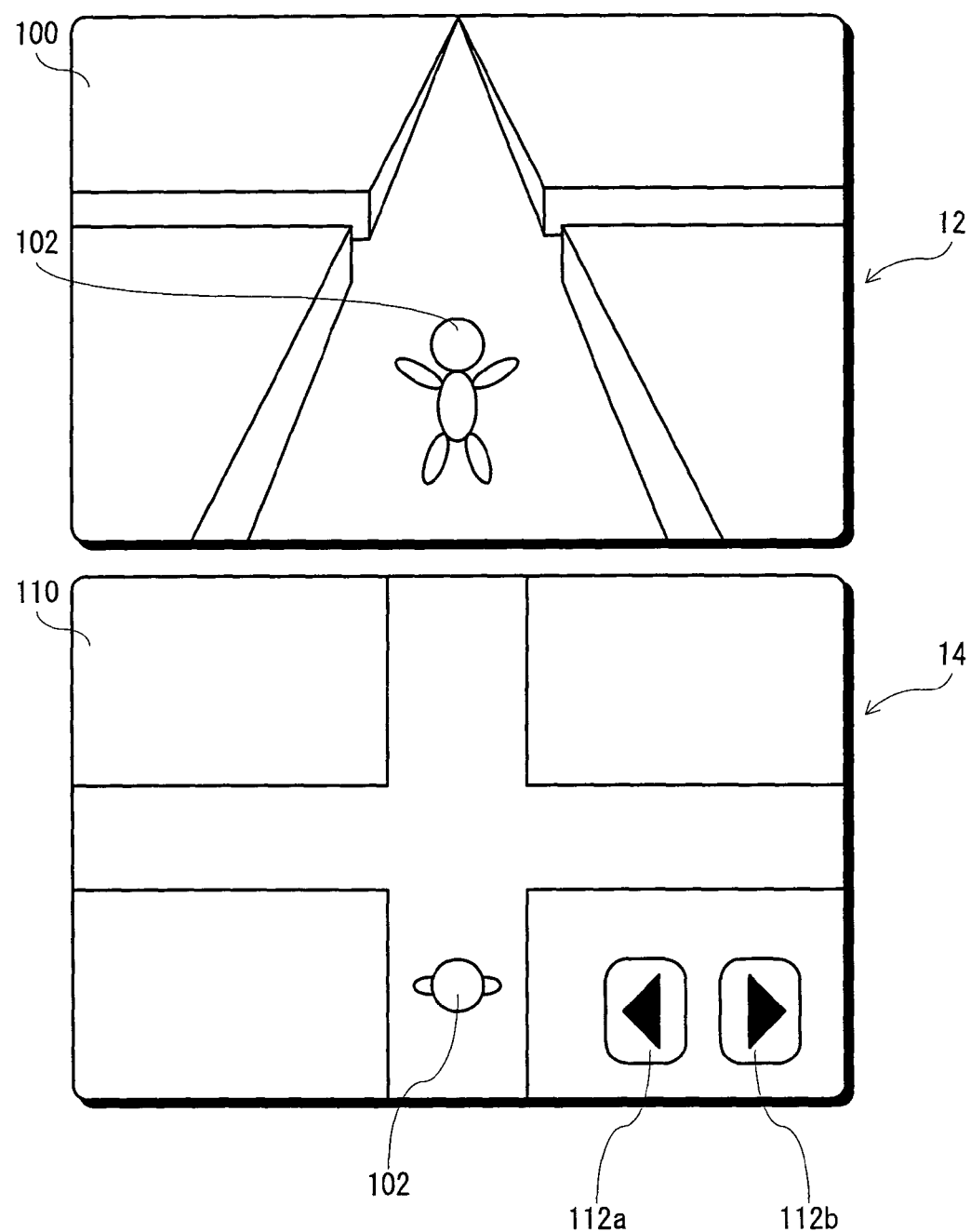
FIG. 3 is an illustrative view showing a display example of two LCDs provided on the game apparatus shown in FIG. 1.

FIG. 3 is an illustrative view showing an example of game screens to be displayed on the LCD 12 and the LCD 14 of the game apparatus 10 in this embodiment. As shown in FIG. 3, a game screen 100 is displayed on the LCD 12, and a game screen 110 is displayed on the LCD 14. On the game screen 100, a player character 102 is displayed at approximately the center and the lower part of the screen, and a floor (ground) object and a wall object are displayed although it is difficult to understand in the drawing. On the game screen 100, a three-dimensional image (actually, an image shot by a virtual camera (not illustrated) following the player character 102) obtained by viewing a part of a three-dimensional virtual space from the player character's view is displayed. The game screen 110 is a two-dimensional map (that corresponds to an image obtained by viewing the three-dimensional virtual space from directly above in this embodiment) corresponding to the above-described three-dimensional virtual space, and displays the player character 102 (head thereof) at approximately the center and the lower part of the screen and also displays the above-described floor object and wall object.

It is noted that the shot image of the virtual camera is developed in the VRAM 56, and the map image corresponding to the two-dimensional map is developed in the VRAM 58 in this embodiment. The game screen 100 is displayed on the LCD 12, and the game screen 110 is displayed on the LCD 14.

Accordingly, the player feels a reality of the game and depth of the three-dimensional virtual space by viewing the game screen 100, and can confirm a position of the player character 102 on the game map and think about tactic of the proceeding of the game by viewing the game screen 110.

Furthermore, at the lower right of the game screen 110, a left key 112a and a right key 112b are displayed at a constant distance. For example, the player can rotate (pan) the virtual camera to the left (clockwise) or to the right (counterclockwise) about the player character 102 by depressing the left key 112a or the right key 112b with the use of the stick 24 etc. Thus, the shot image of the virtual camera is changed to change the game screen 100. Furthermore, as the virtual camera is rotated, the two-dimensional map (map image) is rotated, and the game screen 110 is also changed. In this embodiment, when the virtual camera is rotated to the left, the two-dimensional map is rotated to the left by the rotated angle. On the other hand, when the virtual camera is rotated to the right, the two-dimensional map is rotated to the right by the rotated angle.

It is noted that, although illustration is omitted, in a case that the left key 112a, the right key 112b, and an area except for the area between the left key 112a and the right key 112b are depressed (subjected to a drag operation) by the stick 24, etc., it is possible to move the player character 102 in the three-dimensional virtual space. For example, the player character 102 is moved by the distance corresponding to the length (distance) of a drag operation. At this time, the moving speed of the player character 102 may be a constant speed, and may be proportional to the length (distance) of the drag operation. Furthermore, the moving direction of the player character 102 is coincident with the direction of the drag operation. Furthermore, as the player character 102 moves in the three-dimensional virtual space, the position of the player character 102 in the two-dimensional map is also updated.

Figure 4:
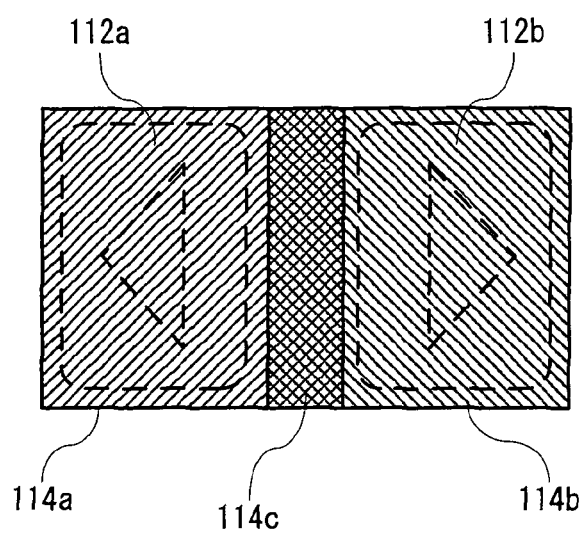
FIG. 4 is an illustrative view showing operation effective areas and a middle area set corresponding to key designs to be displayed on the second LCD.

FIG. 4 is an illustrative view showing the operation effective areas provided respectively corresponding to the left key 112a and the right key 112b and the area between the two keys (or the operation effective areas) (hereinafter referred to as "middle area"). As understood from FIG. 4, the operation effective area 114a is provided in correspondence to the left key 112a, and the operation effective area 114b is provided in correspondence to the right key 112b. Here, the operation effective area is an area for determining whether or not a touch input is effective when there is the touch input by the player. Then, in a case that the touch input is effective, a process (game process) according to a command set to the key displayed in correspondence to the area is executed.

As understood from FIG. 4, the respective operation effective area 114a and operation effective area 114b are set so as to make little larger in size than the left key 112a and the right key 112b (key design). This is because that in games, the player sometimes makes an operation with his fingers, and in response to slightly touch of the key figure (key design) with his fingers, it is necessary to determine that there is an operation of the key. It is noted that in a game in which a touch input is utilized with only the stick 24, the operation effective area may be set to become the same size (shape) as the key design.

Furthermore, the operation effective area 114a and the operation effective area 114b are set on the touch panel 22 so as to respectively corresponding to the key designs of the left key 112a and the right key 112b. More specifically, as described later, in a data storage area (see FIG. 10) of the RAM 48, a plurality of coordinate data (group of coordinate data) each corresponding to the operation effective area 114a and the operation effective area 114b are stored. Each coordinate data corresponds to each of dots of the touch panel 22 included in an area slightly larger than the key design to be displayed on the LCD (LCD 14, in this embodiment).

It is noted that in this embodiment, the resolution of the LCD and the detection accuracy of the touch panel are set to be the same as described above, and therefore, it is possible to easily set the operation effective area according to the display position of the key design.

The middle area 114c is an area provided between the first operation effective area 114a and the second operation effective area 114b. The reason why the middle area 114c is provided is that it is necessary to precisely determine which key is operated when each of the left key 112a and the right key 112b is operated. For example, in a case that the left key 112a and the right key 112b are provided so as to be next to each other, when the boundary of the two keys is operated, it is impossible to determine which key is operated. That is, it is necessary to prevent the left key 112a and the right key 112b from simultaneously being operated.

It is noted that in some games, there is a case of performing an operation peculiar to the game such as continuous (combined) operation of the left key 112a and the right key 112b. For example, the player sometimes operates the left key 112a with his finger (depresses), and then performs a drag operation through the middle area 114c so as to operate the right key 112b, and vice versa. In such a case, where no key is assigned to the middle area 114c, the player depresses (points) the middle area 114c to cause a no input state, resulting in discontinuous touch input by the player. Accordingly, the movement of the virtual camera becomes discontinuous, giving uncomfortable feeling to the player viewing the game screen 100 and the game screen 110.

Here, in this embodiment, the discontinuous touch input is prevented by setting the middle area 114c as the operation effective area of any one of the keys (112a, 112b). The detailed description is as follows.

Figure 5:
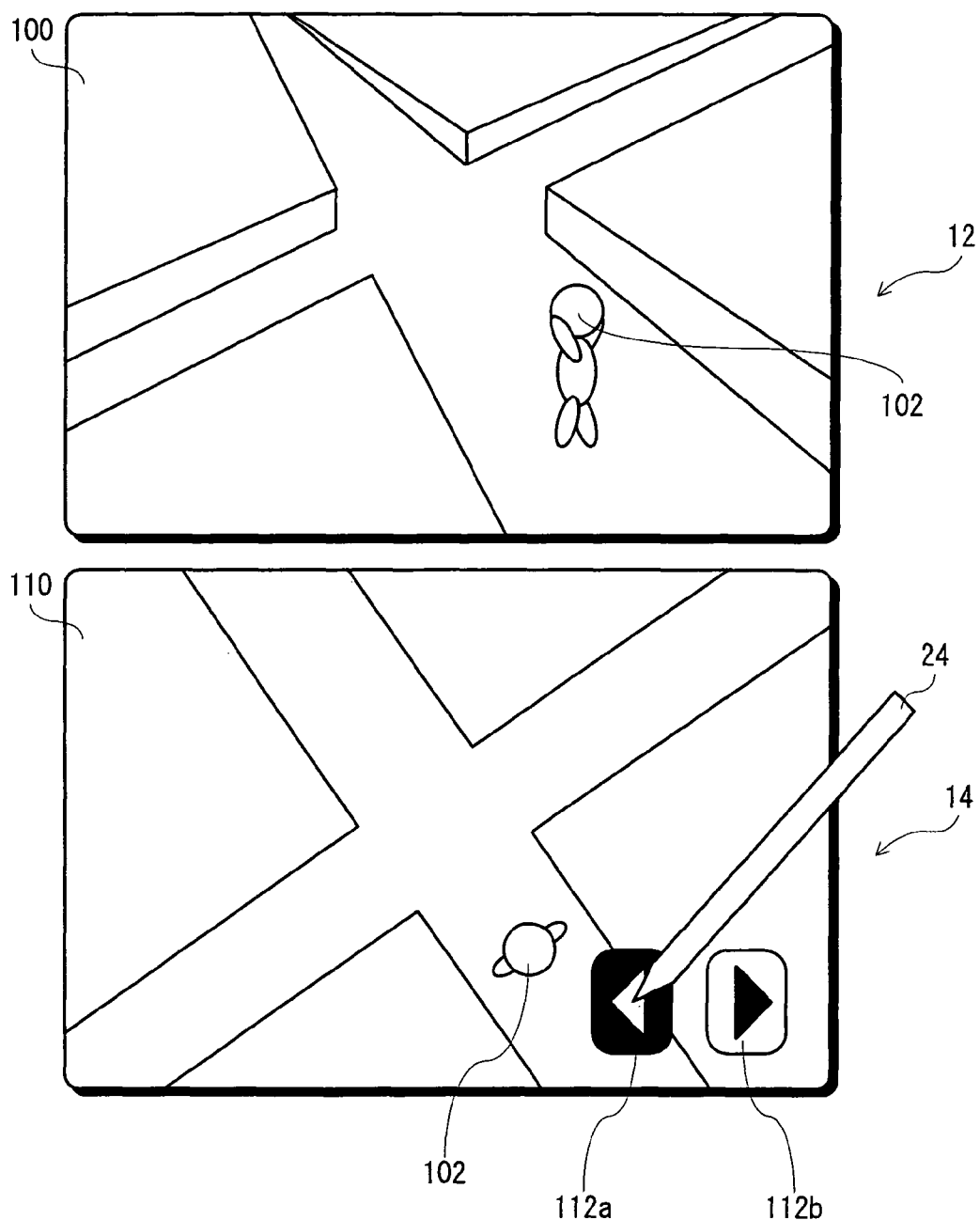
FIG. 5 is an illustrative view showing another display example and operation example of the two LCDs provided on the game apparatus shown in FIG. 1.

FIG. 5 is an illustrative view showing the game screen 100 and game screen 110 when the player depresses (performs a touch-on) the left key 112a with the use of the stick 24 in a state that the game screen 100 and the game screen 110 shown in FIG. 3 are displayed. It is noted that the player may perform a touch input with his finger. The depressed (operated) left key 112a is represented by highlighting the key design between light and dark. Although illustration is omitted, the touch panel 22 is provided on the LCD 14 as described above. This is true for the following.

That is, when the touch-on is performed on the left key 112a in a state that the touch panel 22 is not operated (in a touch-off state), the left key 112a is set to the effective state, and the game image (game screen) is changed on the basis of the left key 112a that is set to the effective state. More specifically, in FIG. 3 state, the virtual camera follows the player character 102 from directly back thereof, and in response to the touch-on of the left key 112a, the virtual camera is rotated to the left about the player character 102, and whereby, the game screen 100 shown in FIG. 5 is displayed on the LCD 12. Furthermore, at this time, the two-dimensional map is rotated to the left by the rotated angle of the virtual camera, and whereby, the game screen 110 shown in FIG. 5 is displayed on the LCD 14.

Thus, in a case that the left key 112a is set to the effective state, the virtual camera is rotated to the left according to the command set (assigned) to the left key 112a, which changes the game screen 100 and the game screen 110. This is true for the following.

Here, as described above, the reason why the left key 112a is set to the effective state when the left key 112a is shifted from the touch-off state to the touch-on state is that the middle area 114c is set to the operation effective area of the left key 112a in a case of performing a drag operation as described later. Furthermore, as described later, when the right key 112b is shifted from the touch-off state to the touch-on state, the right key 112b is set to the effective state, and the middle area 114c is set to the operation effective area of the right key 112b.

It is noted that when the right key 112b is operated after the left key 112a is set to the effective state, the effective state setting to the left key 112a is canceled, and the right key 112b is set to the effective state. On the other hand, when the left key 112a is operated after the right key 112b is set to the effective state, the effective state setting to the right key 112b is canceled, and the left key 112a is set to the effective state. That is, both the left key 112a and the right key 112b are never set to the effective state. In addition, in a case that the left key 112a or the right key 112b is set to the effective state, when the player releases the stick 24, etc. from the touch panel 22, that is, when the touch-on state is shifted to the touch-off state, the effective state setting is canceled. Furthermore, in a case that the left key 112a or right key 112b is set to the effective state, when the player moves the stick 24, etc. to an area except for the operation effective area 114a, the operation effective area 114b, and middle area 114c also, the effective state setting is canceled.

It is noted that in FIG. 5 (hereinafter, this is true for FIG. 6-FIG. 9), rotation of the virtual camera cannot continuously show a changing manner of the game screen 100 and the game screen 110, and therefore, the game screen 100 and the game screen 110 during change (or after change) are illustrated.

In addition, in a case that the player continues to perform a touch-on on the left key 112a (this is true for the right key 112b), the virtual camera continues to rotate to the left, and then, in response to the touch-off of the left key 112a, the rotation of the camera is stopped. This is true for the following.

Figure 6:
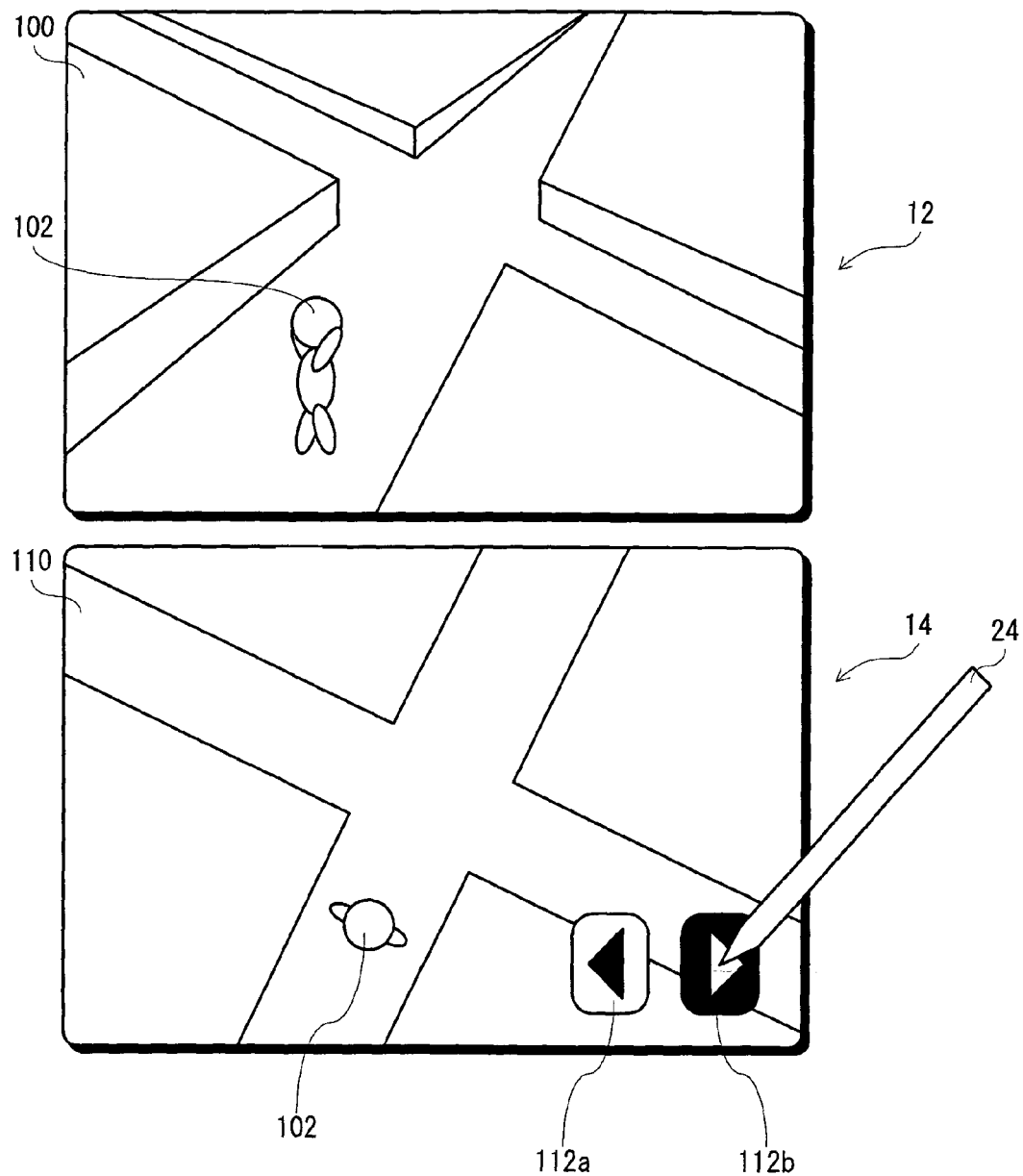
FIG. 6 is an illustrative view showing the other display example and operation example of the two LCDs provided on the game apparatus shown in FIG. 1.

FIG. 6 is an illustrative view showing the game screen 100 and game screen 110 when the player performs a touch-on on the right key 112b by use of the stick 24, etc. in a case that the game screen 100 and the game screen 110 shown in FIG. 3 are displayed. That is, when the right key 112b is shifted from the touch-off state to the touch-on state, the right key 112b is set to the effective state, and the game screen 100 and the game screen 110 are changed according to the right key 112b that is set to the effective state. More specifically, the virtual camera is rotated to the right about the player character 102 to show the game screen 100 in FIG. 6, and according to the rotated angle thereof, the two-dimensional map is rotated to the right to display the game screen 110 shown in FIG. 6.

Thus, in a case that the right key 112b is set to the effective state, the virtual camera is rotated to the right according to the command set (assigned) to the right key 112b, and whereby, the game screen 100 and the game screen 110 are changed. This is true for the following.

Figure 7:
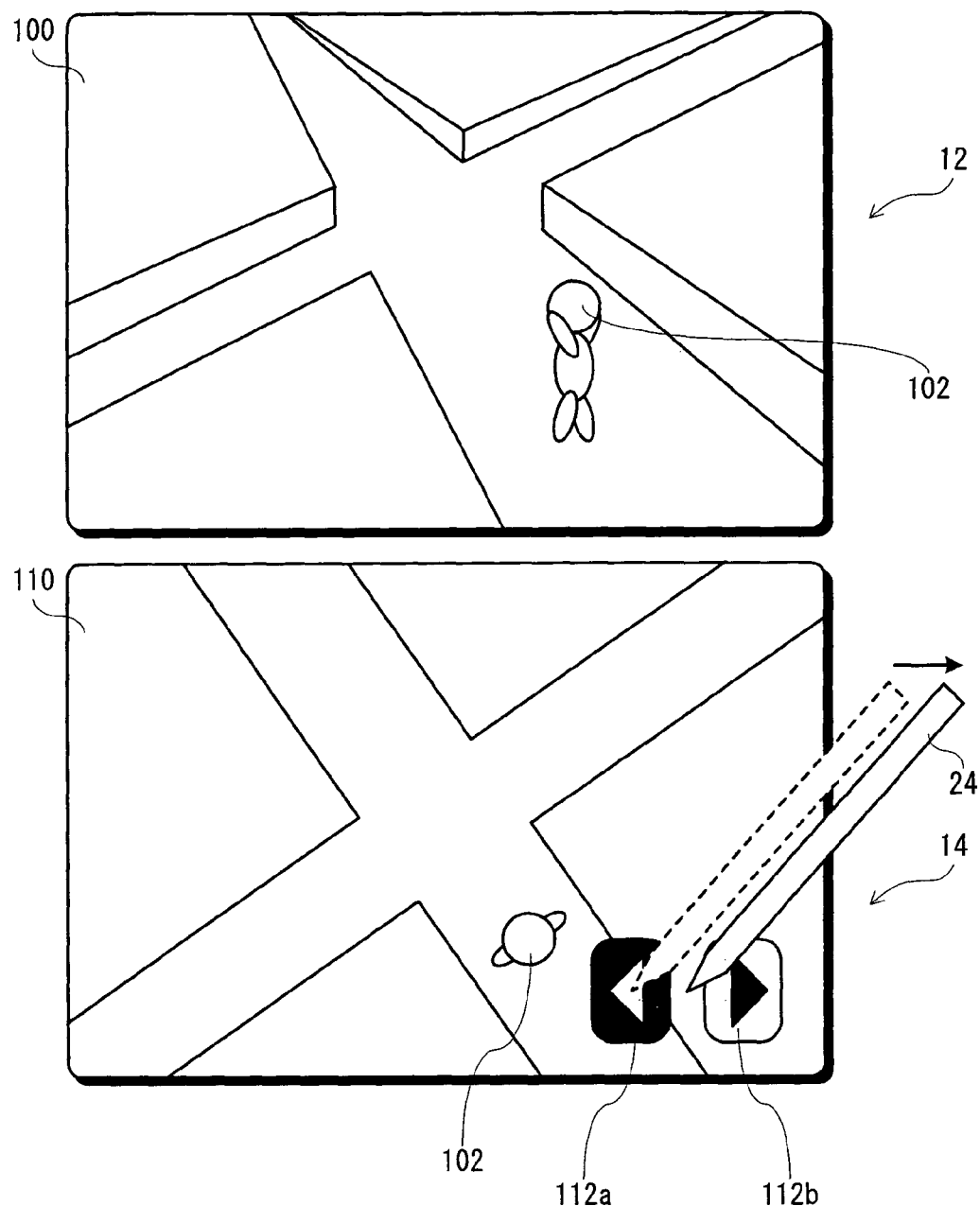
FIG. 7 is an illustrative view showing a further display example and operation example of the two LCDs provided on the game apparatus shown in FIG. 1.

FIG. 7 shows a state in which the player slides (drags) the stick 24 on the touch panel 22 so as to point the middle area 114c (not illustrated) in a state shown in FIG. 5, that is, in the touch-on state of the left key 112a. As described above, when the left key 112a is shifted from the touch-off state to the touch-on state, the left key 112a is set to the effective state, and the game screen 100 and game screen 110 are changed on the basis of the operation of the left key 112a. At this time, the middle area 114c is set to the operation effective area of the left key 112a according to the left key 112a that has been set to the effective state. Accordingly, in a case that the player operates the left key 112a, and then, performs a drag operation to point the middle area 114c also, the virtual camera continues to rotate to the left. According thereto, the map image is also rotated to the left.

Figure 8:
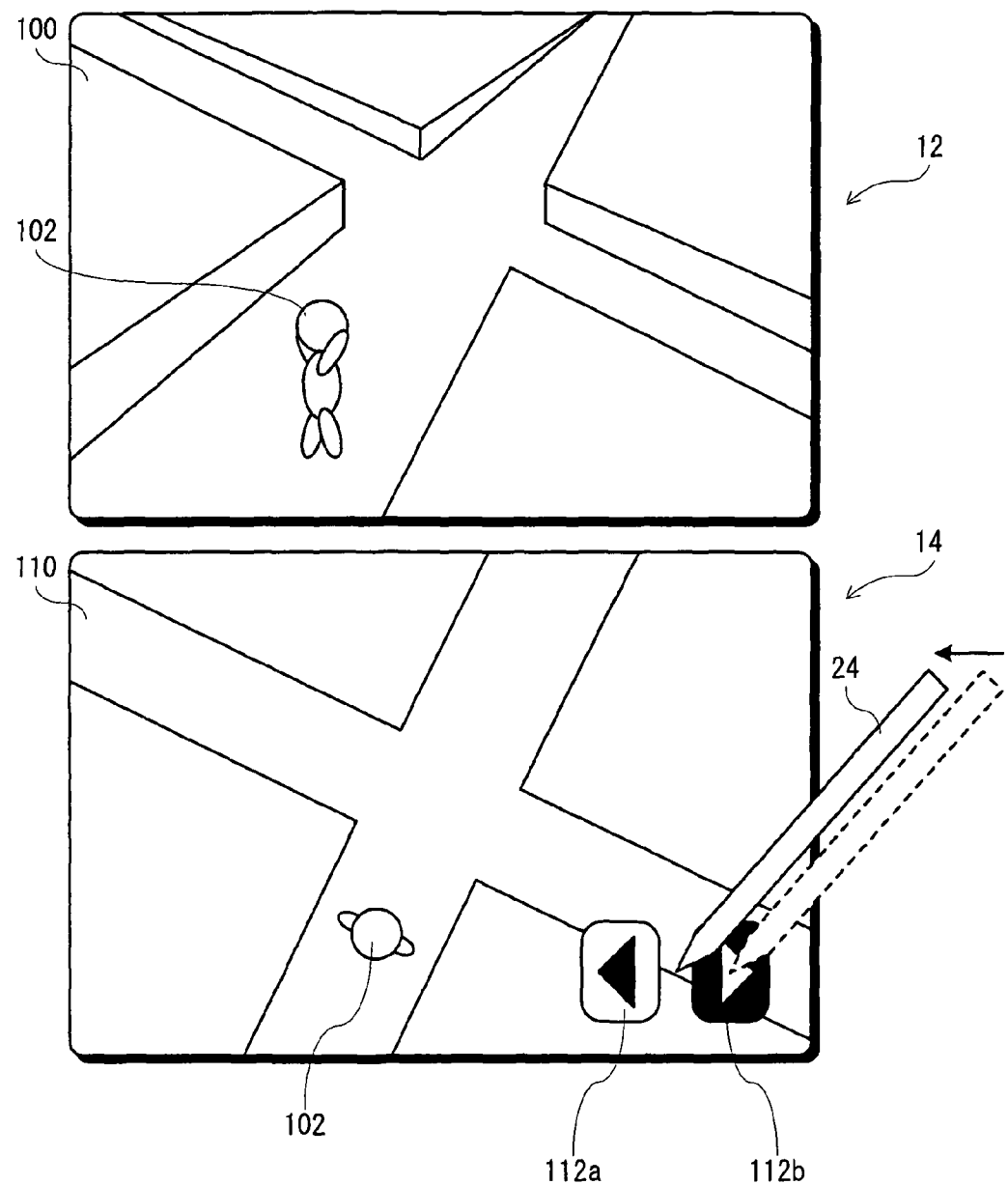
FIG. 8 is an illustrative view showing another display example and operation example of the two LCDs provided on the game apparatus shown in FIG. 1.

Conversely, as shown in FIG. 8, in a case that the player operates the right key 112b from the touch-off state, and then performs a drag operation to point the middle area 114c also, the middle area 114c is set to the operation effective area of the right key 112b as described above, and therefore, the virtual camera continues to rotate to the right. According thereto, the map image is also rotated to the right.

Figure 9:
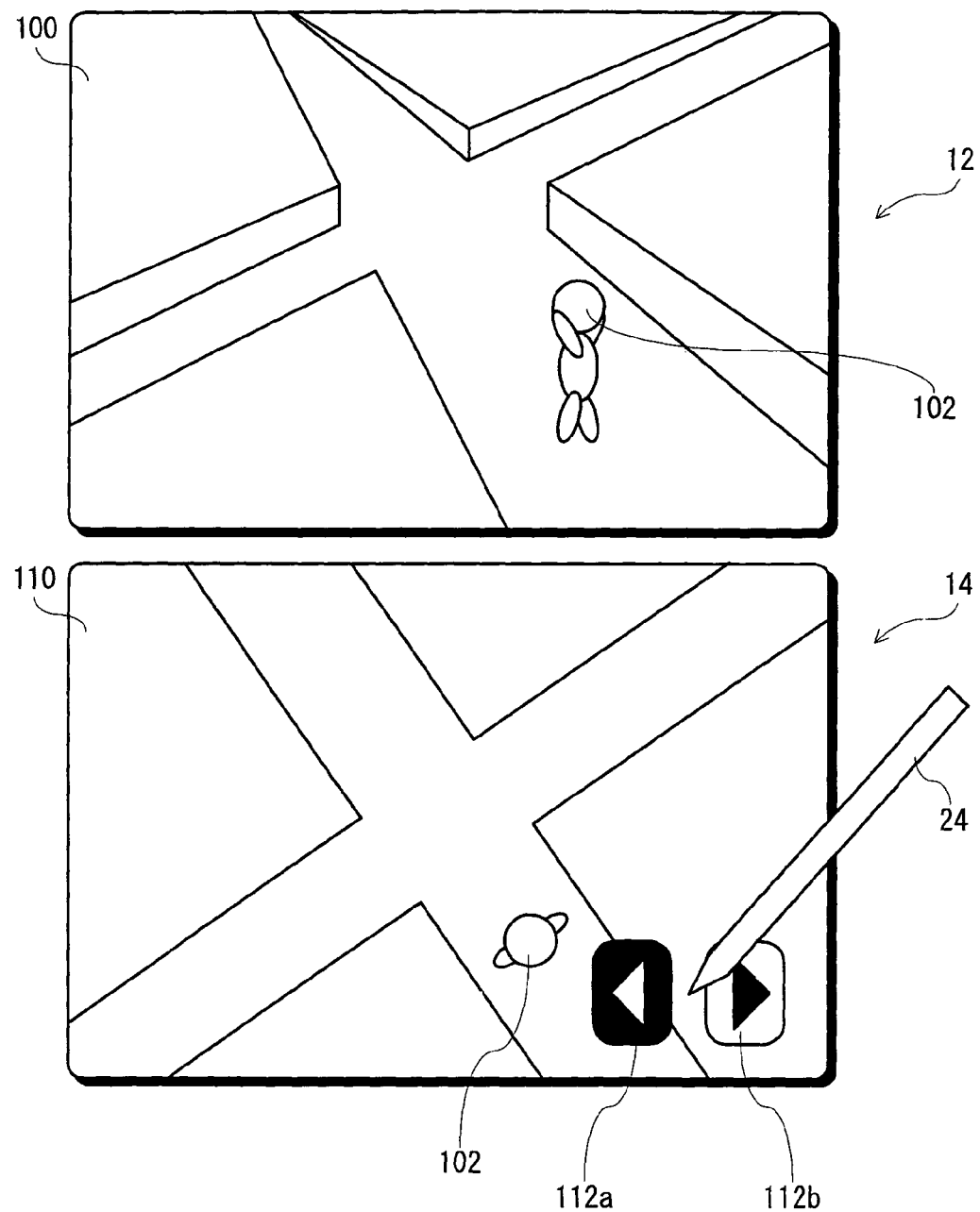
FIG. 9 is an illustrative view showing the other display example and operation example of the two LCDs provided on the game apparatus shown in FIG. 1.

It is noted that in a case that the touch-on is performed on the area (middle area 114c) between the two keys in a state that neither the left key 112a nor the right key 112b is operated (be subjected to the touch-on), that is, in a case that the touch-on is directly performed on the area between the two keys, it is determined that the left key 112a is operated as shown in FIG. 9. This is because that in a case that a touch input is performed on the area between the operation key 112a and the operation key 112b by the stick 24, etc., the game image is changed in response to the touch input. That is, it is necessary to save inconvenience of causing no change in the game image (game screen) even though there is a touch input by the player. Especially, because in a case that the player performs a touch input with his finger, the game screen may not be changed regardless of a touch of the left key 112a or the right key 112b, or the both thereof with his finger.

Accordingly, in this embodiment, in a case that the middle area 114c is depressed in a touch-off state where the operation key 112a and the operation key 112b are not set to the effective state, the operation key 112a is set to the effective state, and whereby, the virtual camera is rotated to the left, and the map image is rotated to the left.

It is noted that in such a case, the operation key 112b is set to the effective state, and whereby, the virtual camera may be rotated to the right, and the map image may be rotated to the right. Or, it may be possible that without setting the operation key 112a and operation key 112b to the effective state, the erroneous operation may be informed by a message display, alarmed with sound (warning beep), or informed by performing the both.

Thus, by operating the left key 112a or the right key 112b, it is possible to control the rotation of the virtual camera, and by also dragging from the left key 112a to the right key 112b, or from the right key 112b to the left key 112a, it is possible to continuously control the rotation of the virtual camera.

Figure 10:
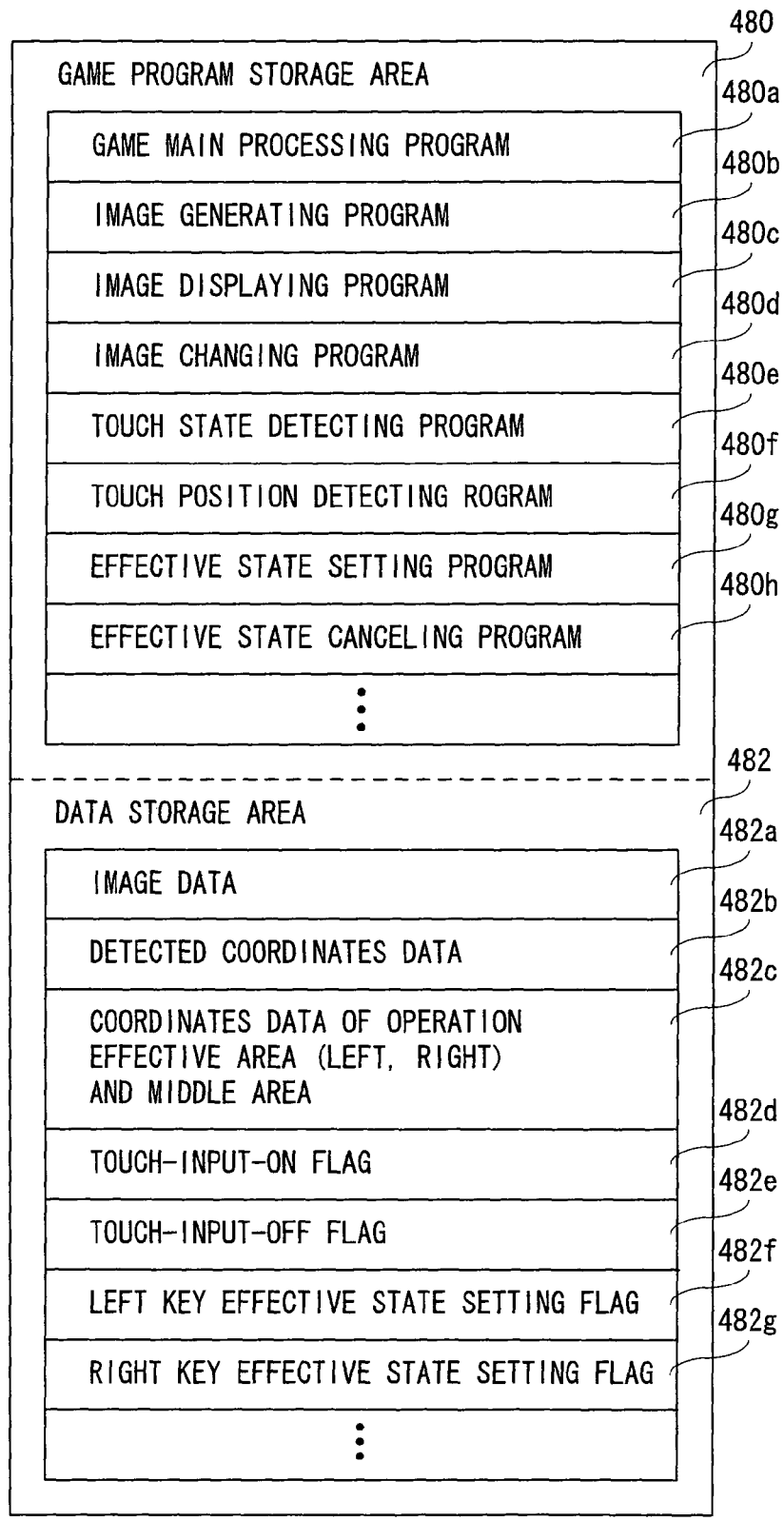
FIG. 10 is an illustrative view showing a memory map of a RAM in FIG. 2.

FIG. 10 is an illustrative view showing a memory map of the RAM48 provided in the game apparatus 10. Referring to FIG. 10, the RAM48 includes a game program storage area 480 and a data storage area 482. The game program storage area 480 stores a game program, and the game program consists of a game main processing program 480a, an image generating program 480b, an image displaying program 480c, an image changing program 480d, a touch state detecting program 480e, a touch position detecting program 480f, an effective state setting program 480g, an effective state canceling program 480h, etc.

The game main processing program 480a is a program for processing a main routine of the game (virtual game) to be executed in the game apparatus 10. The image generating program 480b is a program for generating a game image such as a background object, a player character, a non-player character (enemy character and item character) by use of image data 482a described later. The image displaying program 480c is a program for displaying the game image according to the image generating program 480b as a game screen. The image changing program 480d is a program for changing the game image according to the key that is set to the effective state. In this embodiment, a viewpoint, that is, a direction of the virtual camera is changed. In addition, the image changing program 480d is a program for rotating the map image with the rotation of the virtual camera.

The touch state detecting program 480e is a program for determining whether or not there is a touch input every predetermined time (one frame: screen updating time 1/60 seconds in this embodiment), and turning a touch-input-on flag 482d described later on and turning a touch-input-off flag 482e off when there is a touch input, and conversely, turning the touch-input-on flag 482d off, and turning the touch-input-off flag 482 on when there is not touch input. More specifically, the touch-on state, the touch-off state, and a changing manner are detected. It is noted that whether or not there is a touch input is determined depending on whether or not the coordinate data is input from the touch panel 22, and if the coordinate data is input, it is determined that there is the touch input, and the input (detected) coordinate data is (temporarily) stored as detected coordinate data 482 described later in the data storage area 482. Conversely, if the coordinate data is not input from the touch panel 22, it is determining that there is no touch input, and turning on/off of the flag is only executed as described above. The touch position detecting program 480f is a program for detecting in which area the coordinate data detected according to the touch state detecting program 480e, that is, the detected coordinate data 482 is included, the operation effective area 114a, the operation effective area 114b, the middle area 114c, or the area except for these areas.

The effective state setting program 480g is a program for setting the left key 112a or the right key 112b to the effective state, and for turning on/off a left key effective state setting flag 482f and a right key effective state setting flag 482g to be described later. The effective state canceling program 480h is a program for turning off the effective state setting to the left key 112a or the right key 112b. That is, the left key effective state setting flag 482f and the right key effective state setting flag 482g are turned off.

It is noted that although illustration is omitted, a sound reproduction program, a backup program, etc. are stored in the game program storage area 480. The sound reproduction program is a program for reproducing a sound (music) necessary for the game by utilizing sound data. The backup program is a program for storing (saving) data (proceeding data and result data) generated in correspondence with the proceeding of the game in the RAM28b of the memory card 28.

The data storage area 482 stores the image data 482a, the detected coordinate data 482b, and the coordinate data 482c as to the operation effective area and the middle area, etc. In addition, the data storage area 482 stores the touch-input-on flag 482d, the touch-input-off flag 482e, the left key effective state setting flag 482f, the right key effective state setting flag 482g, etc.

The image data 482a is image data for generating a game image, etc., and specifically is data as to a polygon, a texture, and so on necessary for rendering the game image including the player character, the non-player character, the background object, etc. In addition, data necessary for displaying an icon such as a key design, etc. is also included. The detected coordinate data 482b is coordinate data detected according to the touch state detecting program 480e from the touch panel 22.

The coordinate data 482c of the operation effective area and the middle area are data (coordinate data group) of dots on the touch panel 22 each corresponding to the operation effective area 114a, the operation effective area 114b, and the middle area 114c, and stored for each area. Noted that each of the operation effective area 114a, the operation effective area 114b, and the middle area 114c is defined in square in this embodiment, and it is simply determine which area is pointed, and therefore, there is no need to store the coordinate data corresponding to all dots within each of the areas. If coordinate data of at least two apexes forming an opposite angle out of all apexes of the square for each area are stored, it is possible to determine which area is pointed. It is noted that for the simplicity of the arithmetic operation, the coordinate data of all the apexes (four apexes) of square may be stored.

The touch-input-on flag 482d is a flag that is turned on in the touch-on state, and turned off in the touch-off state (when the touch-input-off flag 482e to be described later is turned on). Turning on/off the flag 482d is executed according to the touch state detecting program 480e as described above. The touch-input-off flag 482e is a flag that is turned on in the touch-off state, and turned off in the touch-on state (the above-described touch-input-on flag 482d is turned on). Turning on/off the flag 482e is also executed according to the touch state detecting program 480e as described above.

The left key effective state setting flag 482f is a flag that is turned on when the touch-on is performed on the left key 112a, and is turned off when the right key 112b is set to the effective state (when the right key effective state setting flag 482g to be described later is turned on), or when the touch-on is performed on the area except for the operation effective areas 114a, 114b and the middle area 114c. Turning on/off of the flag 482f is executed according to the effective state setting program 480g and the effective state canceling program 480h as described above. The right key effective state setting flag 482g is turned on when the touch-on is performed on the right key 112b, and is turned off when the left key 112a is set to the effective state (the above-described left key effective state setting flag 482f is turned on), or when the touch-on is performed on the area except for the operation effective area 114a, 114b and the middle area 114c. Turning on/off the flag 482g is also executed by the effective state setting program 480g and the effective state canceling program 480h.

It is noted that although illustration is omitted, in the data storage area, the sound data for reproducing a sound necessary for the game, the position coordinate data of the player character 102, the position coordinate data of the virtual camera are stored, and the map data as to the two-dimensional map is also stored.

Figure 11:
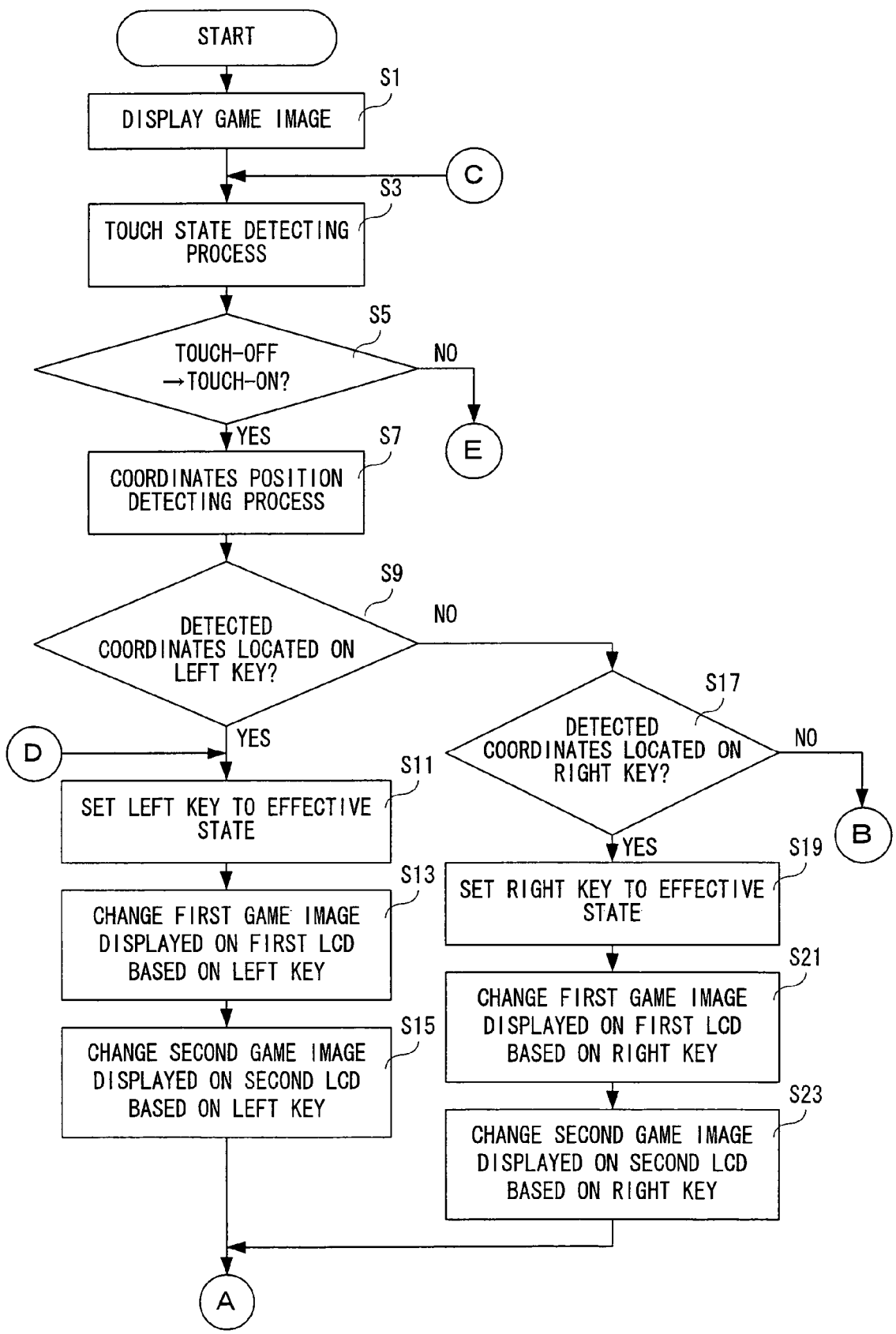
FIG. 11 is a flowchart showing a part of a game process of a CPU core shown in FIG. 2.

More specifically, the CPU core 42 shown in FIG. 2 executes an operation described above according to a flowchart shown in FIG. 11-FIG. 15. Referring to FIG. 11, the CPU core 42 displays the game image, that is, the game screen 100 and the game screen 110 at a start of the game process in a step S1. In a following step S3, a touch state detecting process is executed. More specifically, it is determined whether or not the coordinate data is input from the touch panel 22. Then, if there is an input of the coordinate data, the coordinate data is temporarily stored as the detected coordinate data 482b in the data storage area 482. Then, the touch-input-on flag 482d is turned on, and the touch-input-off flag 482e is turned off. On the other hand, if there is no input of the coordinate data, the touch-input-on flag 482d is turned off, and the touch-input-off flag 482e is turned on.

In a succeeding step S5, it is determined whether or not the touch-off state is shifted to the touch-on state. More specifically, it is determined whether or not the touch-input-on flag 482d is shifted from the turn-off state to the turn-on state, and the touch-input-off flag 482e is shifted from the turn-on state to the turn-off state.

Figure 13:
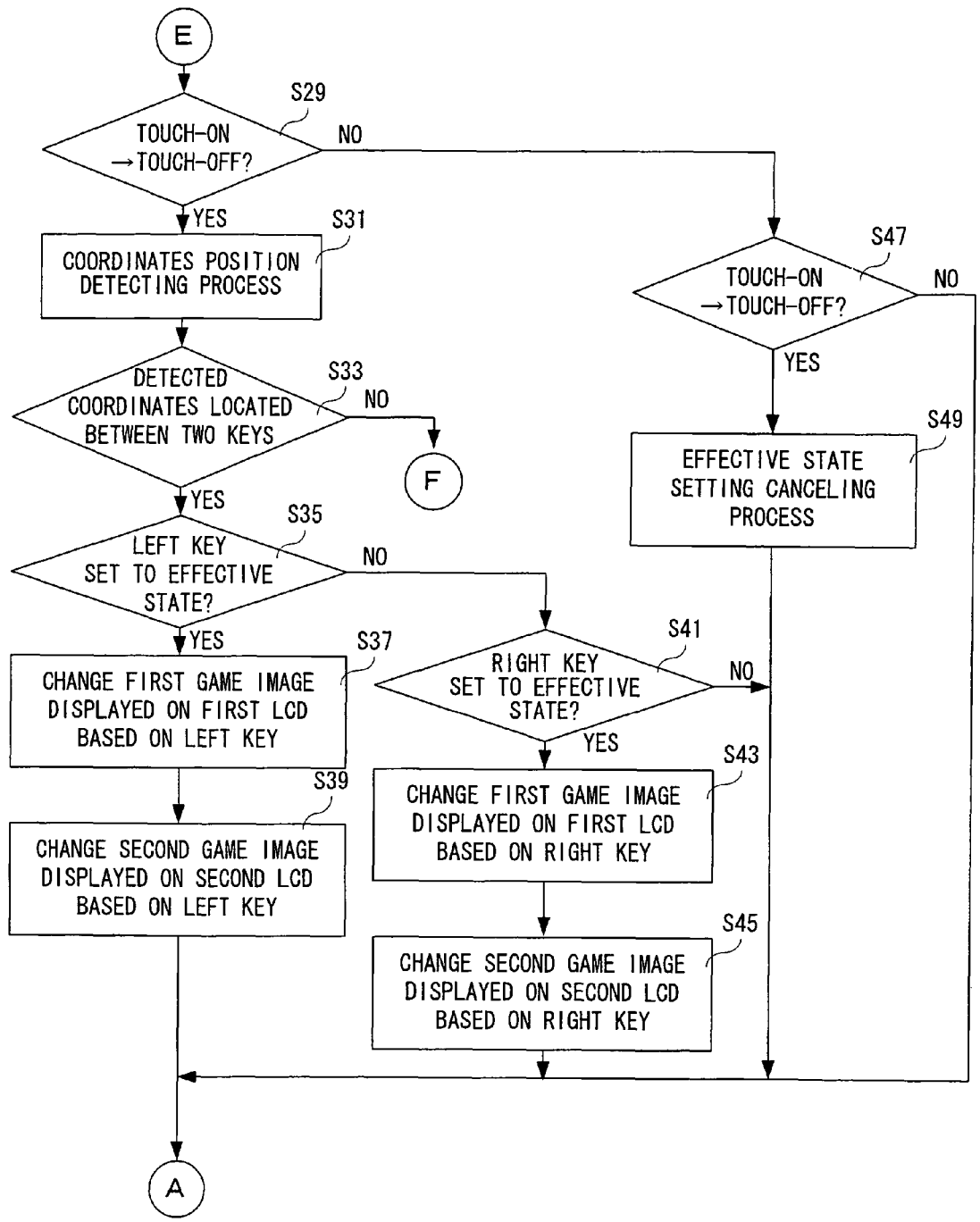
FIG. 13 is a flowchart showing the other part of the game process of the CPU core shown in FIG. 2.

If "NO" in the step S5, that is, if the touch-off state is not shifted to the touch-on state, the process proceeds to a step S29 shown in FIG. 13. However, if "YES" in the step S5, that is, if the touch-off state is shifted to the touch-on state, a coordinate position detecting process is executed in a step S7, and then, the process proceeds to a step S9. That is, in the step S7, the CPU core 42 determines which areas of the touch panel 22, that is, the LCD 14 the coordinates indicated by the detected coordinate data 482b temporarily stored in the data storage area 482 instructs. This is true for the following.

In the step S9, it is determined whether or not the detected coordinates are located on the left key 112a. That is, the detected coordinate data 482b and the coordinate data 482c are compared with each other to determine whether or not the detected coordinates are included in the operation effective area 114a. This is true for the following. If "YES" in the step S9, that is, if the detected coordinates are located on the left key 112a, the left key 112a is set to the effective state, that is, the left key effective state setting flag 482f is turned on. At this time, the right key effective state setting flag 482g is turned off. In a succeeding step S13, the first game image (game screen 100 in this embodiment) displayed on the first LCD (LCD 12 in this embodiment) is changed on the basis of the left key 112a. Similarly, in a step S15, the second game image (game image 110 in this embodiment) displayed on the second LCD (LCD 14 in this embodiment) is changed on the basis of the left key 112a, and then, the process proceeds to a step S27 shown in FIG. 12. That is, in the step S13 and step S15, as described above, an image shot by the virtual camera when the virtual camera is rotated to the left about the player character 102 on the basis of the left key 112a is displayed as the game screen 100, and a map image when the two-dimensional map is rotated to the left according to the rotated angle of the virtual camera is displayed as the game screen 110. Accordingly, the game images are changed. This is true for the following.

If "NO" in the step S9, that is, if the detected coordinates are not located on the left key 112a, it is determined whether or not the detected coordinates are located on the right key 112b in a step S17. More specifically, the detected coordinate data 482b and the coordinate data 482c are compared with each other to determine whether or not the detected coordinates are included in the operation effective area 114b. If "NO" in the step S17, that is, if the detected coordinates are not located on the right key 112b, the process proceeds to a step S25 shown in FIG. 12. However, if "YES" in the step S17, that is, if the detected coordinates are located on the right key 112b, the right key 112b is set to the effective state in a step S19. That is, the right key effective state setting flag 482g is turned on. At this time, the left key effective state setting flag 482f is turned off.

In a succeeding step S21, the first game image, that is, the game screen 100 displayed on the first LCD, that is, the LCD 12 is changed on the basis of the right key 112b. Then, in a step S23, similarly, the second game image, that is, the game screen 110 displayed on the second LCD, that is, the LCD 14 is changed on the basis of the right key 112b. Then, the process proceeds to the step S27. That is, in the step S21 and step S23, as described above, an image shot by the virtual camera when the virtual camera is rotated to the right about the player character 102 on the basis of the right key 112b is displayed as the game screen 100, and a map image when the two-dimensional map is rotated to the right according to the rotated angle of the virtual camera is displayed as the game screen 110. Accordingly, the game images are changed. This is true for the following.

Figure 12:
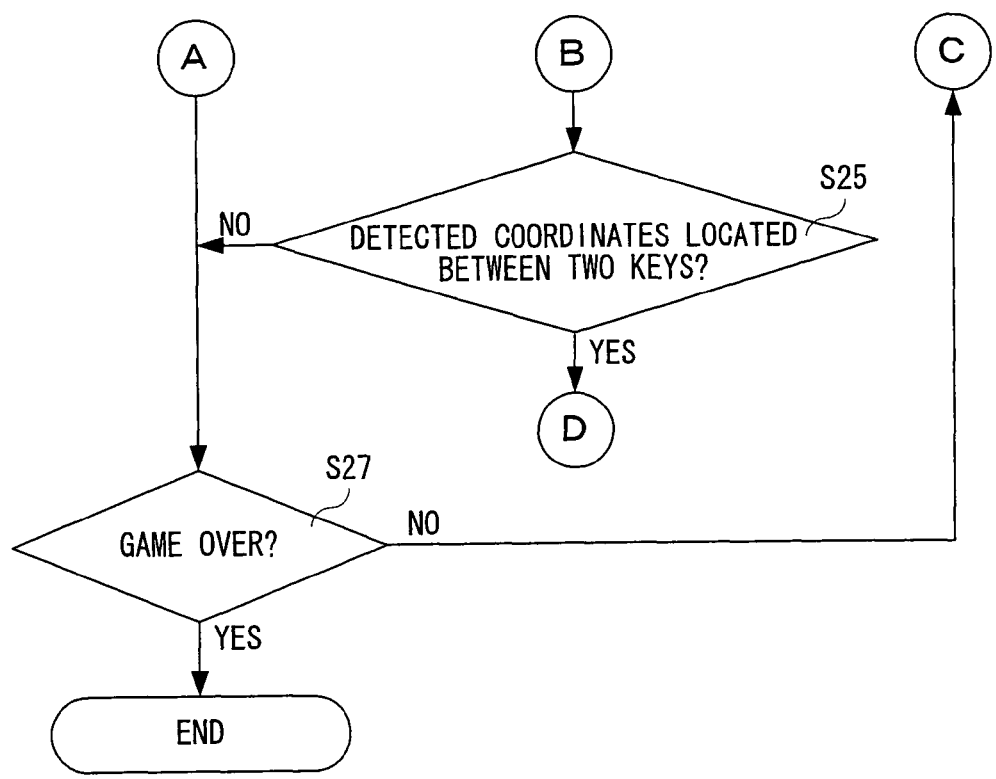
FIG. 12 is a flowchart showing another part of the game process of the CPU core shown in FIG. 2.

As shown in FIG. 12, in the step S25, it is determined whether or not the detected coordinates are located between the two keys, that is, the left key 112a and the right key 112b. More specifically, the detected coordinate data 482b and the coordinate data 482c are compared with each other to determine whether or not the detected coordinates are included in the middle area 114c. This is true for the following. If "NO" in the step S25, that is, if the detected coordinates are not located between the two keys, the process proceeds to the step S27. However, if "YES" in the step S25, that is, if the detected coordinates are located between the two coordinates, the process proceeds to a step S11 shown in FIG. 11. Thus, in a case that the touch-on is performed on the space between the left key 112a and the right key 112b, that is, the middle area 114c in the touch-off state, the virtual camera is rotated to the left about the player character 102, and accordingly, the game screen 100 and game screen 110 are changed.

In the step S27, it is determined whether the game end or not. More specifically, it is determined whether or not a game is over, or whether or not an instruction for the game end is input by the player. If "NO" in the step S27, that is, if it is not the game end, the process directly returns to the step S3 shown in FIG. 11. On the other hand, if "YES" in the step S27, that is, if it is the game end, the process directly ends the game process.

A scan time of the process shown in FIG. 11-FIG. 15 is equal to one frame. Accordingly, the touch state detecting process is executed every predetermined time (S3).

As described above, if "NO" in the step S5, it is determined whether or not the touch on state is not changed in the step S29 as shown in FIG. 13. That is, it is determined whether or not the touch-on state is continued. More specifically, in a case that the touch-input-on flag 482d is turned on, and the touch-input-off flag 482e is turned off, it is determined whether or not the coordinate data from the touch panel 22 is input.

If "NO" in the step S29, that is, if the touch-on state is changed, the process proceeds to a step S47. However, if "YES" in the step S29, that is, if the touch-on state is not changed, the coordinate position detecting process is executed in a step S31, and then, the process proceeds to a step S33.

In the step S33, it is determined whether or not the detected coordinates are located between the two keys. If "NO" in the step S33, that is, if the detected coordinates are not located between the two keys, the process proceeds to a step S51 shown in FIG. 14. However, if "YES" in the step S33, that is, if the detected coordinates are located between the two keys, it is determined whether or not the left key 112a is set to the effective state in a step S35. More specifically, it is determined whether or not the left key effective state setting flag 482f is turned on. This is true for the following.

If "YES" in the step S35, that is, if the left key 112a is set to the effective state, the game image displayed on the first LCD is changed on the basis of the left key 112a in a step S37, and the game image displayed on the second LCD is similarly changed on the basis of the left key 112a in a step S39. Then, the process proceeds to the step S27 shown in FIG. 12.

On the other hand, if "NO" in the step S35, that is, if the left key 112a is not set to the effective state, it is determined whether or not the right key 112b is set to the effective state in a step S41. That is, it is determined whether or not the right key effective state setting flag 482g is turned on. This is true for the following. If "NO" in the step S41, that is, if the right key 112b is not set to the effective state, the process directly proceeds to the step S27 shown in FIG. 12. However, if "YES" in the step S41, that is, if the right key 112b is set to the effective state, the first game image displayed on the first LCD on the basis of the right key 112b is changed in a step S43, and the second game image displayed on the second LCD on the basis of the right key 112a is similarly changed in a step S45. Then, the process proceeds to the step S27.

Furthermore, in the step S47, it is determined whether or not the touch-on state is shifted to the touch-off state. More specifically, it is determined whether or not the touch-input-on flag 482d is shifted from the touch-on-state to the touch-off state, and the touch-input-off flag 482e is shifted from the touch-off state to the touch-on state. That is, it is determined whether or not the touch-input-present state is changed to the touch-input-absent state. If "NO" in the step S47, that is, if the touch-on state is not shifted to the touch-off state, the process directly proceeds to the step S27 shown in FIG. 12. On the other hand, if "YES" in the step S47, that is, if the touch-on state is shifted to the touch-off state, an effective state setting canceling process is executed in a step S49, and the process proceeds to the step S27. That is, in the step S49, the left key effective state setting flag 482f and the right key effective state setting flag 482g are turned off. If the touch-on state is shifted to the touch-off state through the process in the step S49, the effective state setting to the left key 112a or the right key 112b is canceled.

Figure 14:
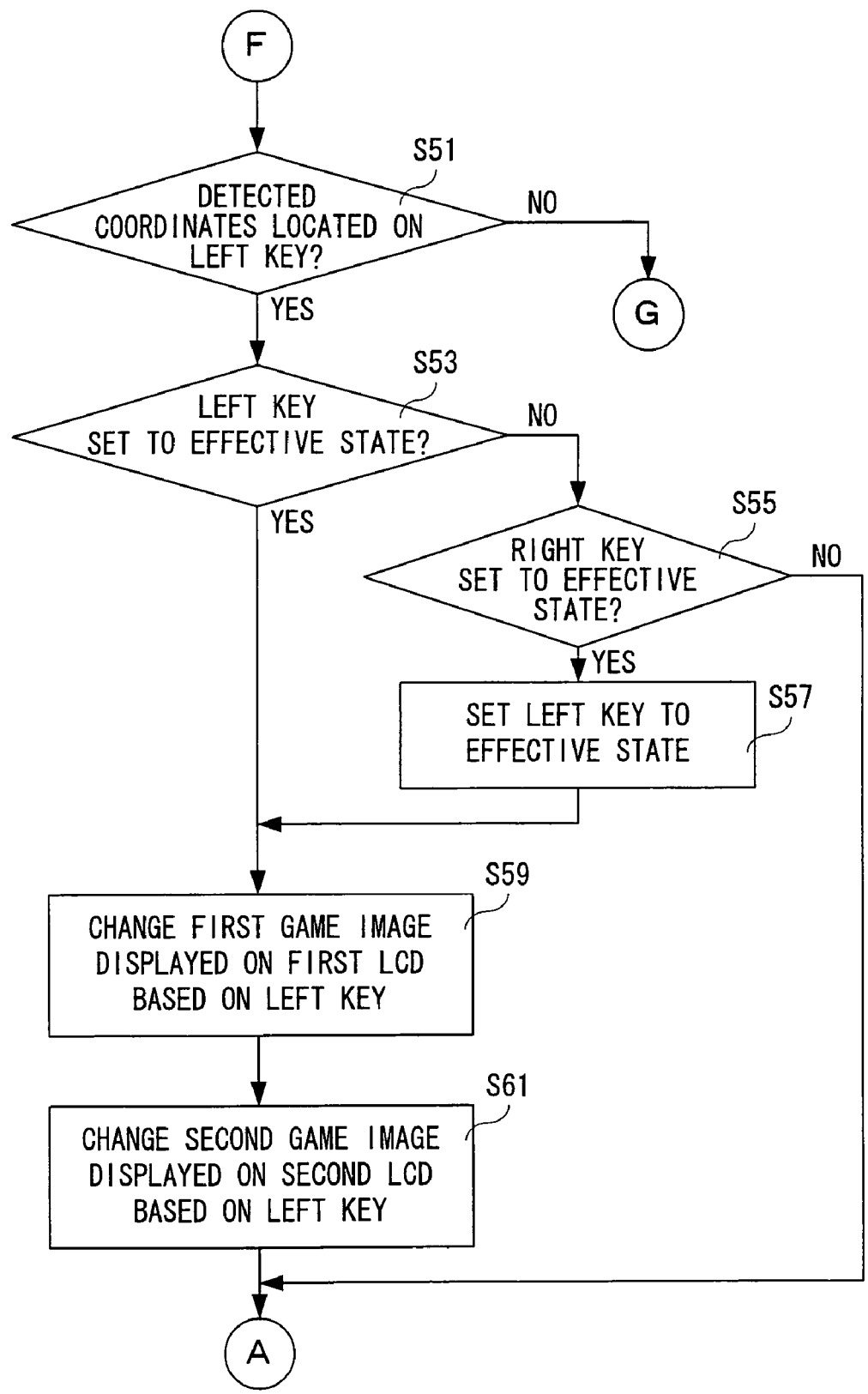
FIG. 14 is a flowchart showing a further part of the game process of the CPU core shown in FIG. 2.

As described above, if "NO" in the step S33 in FIG. 13, it is determined whether or not the detected coordinates are located on the left key 112a in the step S51 shown in FIG. 14. If "NO" in the step S51, that is, if the detected coordinates are not located on the left key 112a, the process proceeds to a step S63 shown in FIG. 15. On the other hand, if "YES" in the step S51, that is, if the detected coordinates are located on the left key 112a, it is determined whether or not the left key 112a is set to the effective state in a step S53.

If "YES" in the step S53, that is, if the left key 112a is set to the effective state, the process directly proceeds to a step S59. However, if "NO" in the step S53, that is, if the left key 112a is not set to the effective state, it is determined whether or not the right key 112b is set to the effective state in a step S55. If "NO" in the step S55, that is, if the right key 112b does not set to the effective state also, it is determined that the touch input is erroneously detected, and then, the process directly proceeds to the step S27 shown in FIG. 12. However, if "YES" in the step S55, that is, if the right key 112b is set to the effective state, the left key 112a is set to the effective state in a step S57, that is, the left key effective state setting flag 482f is turned on, and then, the process proceeds to the step S59. It is noted that the right key effective state setting flag 482g is turned off in the step S57.

In the step S59, the first game image displayed on the first LCD is changed on the basis of the left key 112a. Then, in a step S61, the second game image displayed on the second LCD is similarly changed on the basis of the left key 112a, and then, the process proceeds to the step S27.

Figure 15:
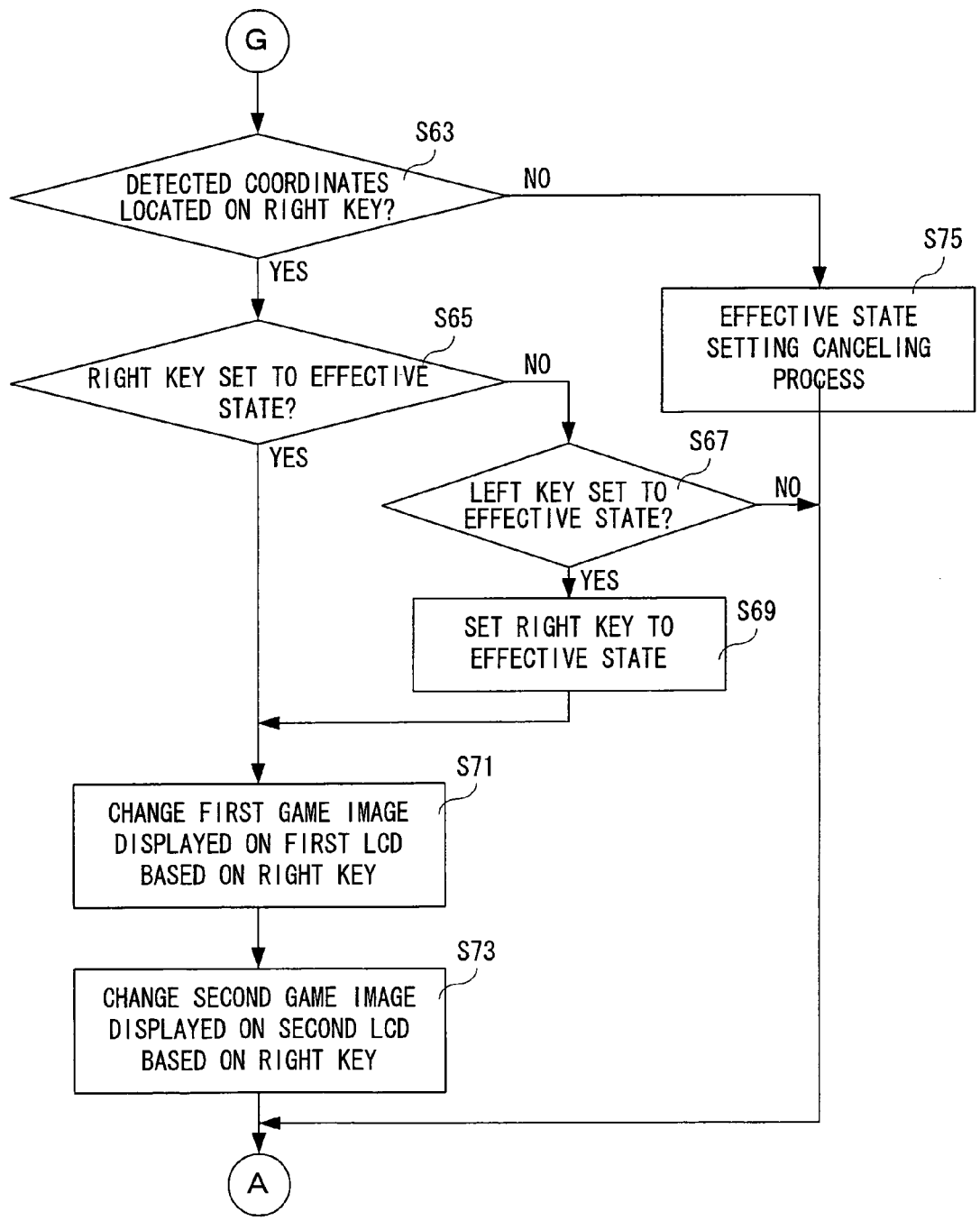
FIG. 15 is a flowchart showing another part of the game process of the CPU core shown in FIG. 2.

Furthermore, if "NO" in the step S51 in FIG. 14, it is determined whether or not the detected coordinates are located on the right key 112b in the step S63 shown in FIG. 15. If "NO" in the step S63, that is, if the detected coordinates are not located on the right key 112b, the effective state setting canceling process is executed in a step S75, that is, the left key effective state setting flag 482f and the right key effective state setting flag 482g are turned off, and then, the process proceeds to the step S27 shown in FIG. 12. By the process in the step S75, in a case that any one of the left key 112a, the right key 112b and the space between the two keys after the left key 112a and the right key 112b are operated is pointed, the effective state setting to the left key 112a or the right key 112b is canceled.

On the other hand, if "YES" in the step S63, that is, if the detected coordinates are located on the right key 112b, it is determined whether or not the right key 112b is set to the effective state in a step S65. That is, it is determined whether or not the right key effective state setting flag 482g is turned on. If "YES" in the step S65, that is, if the right key 112b is set to the effective state, the process directly proceeds to a step S71. However, if "NO" in the step S65, that is, if the right key 112b is not set to the effective state, it is determined whether or not the left key 112a is set to the effective state in a step S67. That is, it is determined whether or not the left key effective state setting flag 482f is turned on.

If "NO" in the step S67, that is, if the left key 112a is not set to the effective state, it is determined that the touch input is erroneously detected, and then, the process directly proceeds to the step S27 shown in FIG. 12. However, if "YES" in the step S67, that is, if the left key 112a is set to the effective state, the right key 112b is set to the effective state in a step S69, that is, the right key effective state setting flag 482g is turned on, and then, the process proceeds to the step S71. It is noted that in the step S67, the left key effective state setting flag 482*f* is turned off.

In the step S71, the first game image displayed on the first LCD is changed on the basis of the right key 112*b*. Then, in a step S73, the second game image displayed on the second LCD is similarly changed on the basis of the right key 112*b*, and then, the process proceeds to the step S27.

According to this embodiment, in a case that any one of the keys is set to the effective state, when the middle area between the left key and the right key is pointed, the process according to the key that is set to the effective state is executed. Thus, in a case of a combining operation of the left key and the right key, the game process is never discontinuous. That is, it is possible to perform an operation peculiar to the game such as executing each of the game processes by separately operating the two keys, executing one game process by operating the two keys in a combined manner. For example, the left key is operated (touch-on) to allow the player character to punch, and the right key is operated (touch-on) to allow the player character to kick, and the left key and the right key are operated (drag operation) in a combined manner (left key+right key) to allow the player character to perform a special weapon.

Furthermore, the space to some extent between the adjacent key designs is provided, and therefore, in a case that the middle area is pointed, it is possible to prevent the game process from being erroneously executed on the basis of the key input (touch input) not intended by the player. That is, it is possible to reduce an erroneous operation.

It is noted that although a description is only made on a case where the two keys are displayed on the LCD so as to be touch-input in this embodiment, it may be possible to display three or more keys on the LCD. In such a case, the above-described process may be executed by paying attention to the adjacent two keys.

In addition, although a description is only made on a case where two LCDs are provided to display the game screens in this embodiment, it may be possible that one LCD is provided in association with a touch panel to display one game screen on the LCD. In such a case, in the game process shown in FIG. 11-FIG. 15, the process for displaying the game screen on the first LCD and the process for changing the game screen on the first LCD are simply omitted.

Furthermore, although a description is made on the game apparatus provided with the two LCDs in this embodiment, one display area of the LCD is divided into two, and the touch panel is simply provided in association with at least one of the display area. It is appropriate that in a case of providing a vertically long LCD, the display area of the LCD is divided so as to vertically arrange the two display areas, and in a case of providing a horizontally long LCD, the display area of the LCD is divided so as to horizontally arrange the two display areas.

Although the exemplary embodiment presented herein has been described and illustrated in detail, it is clearly understood that the same is by way of illustration and example only and is not to be taken by way of limitation, the spirit and scope being limited only by the terms of the appended claims.

What is claimed is:

1. A game apparatus having a display portion for displaying a game image including at least a first key and a second key and a touch panel provided in association with said display portion, comprising:

operation state detecting programmed logic circuitry for detecting presence or absence of an operation input to said touch panel every predetermined time;

coordinate position detecting programmed logic circuitry for detecting a coordinate position when a presence of the operation input to said touch panel is detected by said operation state detecting programmed logic circuitry;

first pointing state determining programmed logic circuitry for determining whether the coordinate position detected by said coordinate position detecting programmed logic circuitry is included in a first operation effective area of said first key or a second operation effective area of said second key when it is detected that the operation input to the touch panel is shifted from an operation-absent state to an operation-present state by said operation state detecting programmed logic circuitry;

game processing programmed logic circuitry for changing said game image on the basis of said first key when it is determined that said coordinate position is included in said first operation effective area by said first pointing state determining programmed logic circuitry, and changing said game image on the basis of said second key when it is determined that said coordinate position is included in said second operation effective area; and second pointing state determining programmed logic circuitry for determining whether or not the coordinate position detected by said coordinate position detecting programmed logic circuitry is moved to a middle area between said first operation effective area and said second operation effective area after it is determined that said coordinate position is included in any one of said first operation effective area and said second operation effective area by said first pointing state determining programmed logic circuitry, and while the operation-present state to the touch panel is continuously detected by said operation state detecting programmed logic circuitry; wherein said game processing programmed logic circuitry changes said game image on the basis of a determination result of said first pointing state determining programmed logic circuitry when it is determined that the coordinate position is moved to said middle area by said second pointing state determining programmed logic circuitry.

2. A game apparatus according to claim 1, further comprising key effective state setting programmed logic circuitry for setting said first key to an effective state when it is determined that said coordinate position is included in said first operation effective area by said first pointing state determining programmed logic circuitry, and setting said second key to the effective state when it is determined that said coordinate position is included in said second operation effective area by said first pointing state determining programmed logic circuitry; wherein said game processing programmed logic circuitry changes said game image on the basis of said first key or said second key that is set to the effective state by said key effective state setting programmed logic circuitry.

3. A game apparatus according to claim 2, wherein said second pointing state determining programmed logic circuitry determines, after it is determined that said coordinate position is included in one of said first operation effective area and said second operation effective area by said first pointing state determining programmed logic circuitry and while the operation-present state to the touch panel is continuously detected by said operation state detecting programmed logic circuitry, whether or not the coordinate position detected by said coordinate position detecting programmed logic circuitry is moved to the other of said first operation effective area and said second operation effective area, and said key effective state setting programmed logic circuitry, when it is determined that said coordinate position is moved to the other of said first operation effective area and said second operation effective area by said second pointing state determining programmed logic circuitry, sets the key corresponding to the other to the effective state.

4. A game apparatus according to claim 2, wherein said second pointing state determining programmed logic circuitry determines, after it is determined that said coordinate position is included in one of said first operation effective area and said second operation effective area by said first pointing state determining programmed logic circuitry and while the operation-present state to the touch panel is continuously detected by said operation state detecting programmed logic circuitry, whether or not the coordinate position detected by said coordinate position detecting programmed logic circuitry is moved outside said first operation effective area, said second operation effective area, and the middle area, and further comprising:

effective state setting canceling programmed logic circuitry for canceling the setting of the effective state to the key by said key effective state setting programmed logic circuitry when it is determined that said coordinate position is moved outside said first operation effective area, said second operation effective area, and said middle area by said second pointing state determining programmed logic circuitry; wherein said game processing programmed logic circuitry does not change said game image when the effective state setting to the key is canceled by said effective state setting canceling programmed logic circuitry.

5. A game apparatus according to claim 4, wherein said effective state setting canceling programmed logic circuitry cancels the effective state setting of the key by said key effective state setting programmed logic circuitry after it is determined that said coordinate position is included in one of said first operation effective area and said second operation effective area by said first pointing state determining programmed logic circuitry, and when it is detected that the operation input to said touch panel is shifted from the operation-present state to the operation-absent state by said operation state detecting programmed logic circuitry.

6. A game apparatus according to claim 1, wherein said display portion includes a first display area for displaying a first game image and second display area for displaying a second game image including said first key and said second key, and said game processing programmed logic circuitry changes both of said first game image and said second game image.

7. A non-transitory storage medium storing a game program of a game apparatus having a display portion for displaying a game image including at least a first key and a second key and a touch panel provided in association with said display portion, said game program causes a processor of said game apparatus to execute:

operation state detecting for detecting presence or absence of an operation input to said touch panel every predetermined time;

coordinate position detecting for detecting a coordinate position when a presence of the operation input to said touch panel is detected by said operation state detecting;

first pointing state determining for determining whether the coordinate position detected by said coordinate position detecting is included in a first operation effective area of said first key or a second operation effective area of said second key when it is detected that the operation input to the touch panel is shifted from an operation-absent state to an operation-present state by said operation state detecting;

game processing for changing said game image on the basis of said first key when it is determined that said coordinate position is included in said first operation effective area by said first pointing state determining, and changing said game image on the basis of said second key when it is determined that said coordinate position is included in said the second operation effective area; and second pointing state determining for determining whether or not the coordinate position detected by said coordinate position detecting is moved to a middle area between said first operation effective area and said second operation effective area after it is determined that said coordinate position is included in any one of said first operation effective area and said second operation effective area by said first pointing state determining, and while the operation-present state to the touch panel is continuously detected by said operation state detecting; wherein said game processing changes said game image on the basis of a determination result of said first pointing state determining when it is determined that the coordinate position is moved to said middle area by said second pointing state determining.

8. A non-transitory storage medium storing a game program according to claim 7, wherein said game program further executes a key effective state setting for setting said first key to an effective state when it is determined that said coordinate position is included in said first operation effective area by said first pointing state determining, and setting said second key to the effective state when it is determined that said coordinate position is included in said second operation effective area by said first pointing state determining; wherein said game processing changes said game image on the basis of said first key or said second key that is set to the effective state by said key effective state setting.

9. A non-transitory storage medium storing a game program according to claim 8, wherein said second pointing state determining determines, after it is determined that said coordinate position is included in one of said first operation effective area and said second operation effective area by said first pointing state determining and while the operation-present state to the touch panel is continuously detected by said operation state detecting, whether or not the coordinate position detected by said coordinate position detecting is moved to the other of said first operation effective area and said second operation effective area, and said key effective state setting, when it is determined that said coordinate position is moved to the other of said first operation effective area and said second operation effective area by said second pointing state determining, sets the key corresponding to the other to the effective state.

10. A non-transitory storage medium storing a game program according to claim 8, wherein
said second pointing state determining determines, after it is determined that said coordinate position is included in one of said first operation effective area and said second operation effective area by said first pointing state determining, and while the operation-present state to the touch panel is continuously detected by said operation state detecting, whether or not the coordinate position detected by said coordinate position detecting is moved outside said first operation effective area, said second operation effective area, and the middle area; and
said game program further executes an effective state setting canceling for canceling the setting of the effective state of the key by said key effective state setting when it is determined that said coordinate position is moved outside said first operation effective area, said second operation effective area, and said middle area by said second pointing state determining; wherein
said game processing does not change said game image when the effective state setting is canceled by said effective state setting canceling.

11. A non-transitory storage medium storing a game program according to claim 10, wherein
said effective state setting canceling cancels the effective state setting to the key by said key effective state setting after it is determined that said coordinate position is included in one of said first operation effective area and said second operation effective area by said first pointing state determining, and when it is detected that the operation input to said touch panel is shifted from the operation-present state to the operation-absent state by said operation state detecting.

12. A non-transitory storage medium storing a game program according to claim 7, wherein
said display portion includes a first display area for displaying a first game image and a second display area for displaying a second game image including said first key and said second key, and
said game processing changes both of said first game image and said second game image.

13. A game controlling method of a game apparatus having a display portion for displaying a game image including at least a first key and a second key and a touch panel provided in association with the display portion, comprising:
(a) detecting presence or absence of an operation input to said touch panel every predetermined time;
(b) detecting a coordinate position when a presence of the operation input to said touch panel is detected by said detecting of the presence or absence in (a);
(c) determining whether the coordinate position detected by said detecting of the coordinate position in (b) is included in a first operation effective area of said first key or a second operation effective area of said second key when it is detected that the operation input to the touch panel is shifted from an operation-absent state to an operation-present state by said detecting of the presence or absence in (a);
(d) changing said game image on the basis of said first key when it is determined that said coordinate position is included in said first operation effective area by said determining of the coordinate position in (c), and changing said game image on the basis of said second key when it is determined that said coordinate position is included in said the second operation effective area; and
(e) determining whether or not the coordinate position detected by said detecting of the coordinate position in (b) is moved to a middle area between said first operation effective area and said second operation effective area after it is determined that said coordinate position is included in any one of said first operation effective area and said second operation effective area by said determining of the coordinate position in (c), and while the operation-present state to the touch panel is continuously detected by said detecting of the presence or absence in (a); wherein
said changing of the game image in (d) changes said game image on the basis of a determination result by said determining of the coordinate position in (c) when it is determined that the coordinate position is moved to said middle area by said determining of the coordinate position in (e).

14. A game controlling method according to claim 13, further includes
(f) setting said first key to an effective state when said coordinate position is included in said first operation effective area by said determining of the coordinate position in (c), and setting said second key to the effective state when it is determined that said coordinate position is included in said second operation effective area by said determining of the coordinate position in (c); wherein
said changing of the game image in (d) changes said game image on the basis of said first key or said second key that is set to the effective state by said setting of said first key and second key in (f).

15. A game controlling method according to claim 14, wherein
said determining of the coordinate position in (e) determines, after it is determined that said coordinate position is included in one of said first operation effective area and said second operation effective area by said determining of the coordinate position in (c), and while the operation-present state to the touch panel is continuously detected by said detecting of the presence or absence in (a), whether or not the coordinate position detected by said detecting of the coordinate position in (b) is moved to the other of said first operation effective area and said second operation effective area, and
said setting of said first key and second key in (f), when it is determined that said coordinate position is moved to the other of said first operation effective area and said second operation effective area by said determining of the coordinate position in (e), sets the key corresponding to the other to the effective state.

16. A game controlling method according to claim 14, wherein
said determining of the coordinate position in (e) determines, after it is determined that said coordinate position is included in one of said first operation effective area and said second operation effective area by said determining of the coordinate position in (c), and while the operation-present state to the touch panel is continuously detected by said detecting of the presence or absence in (a), whether or not the coordinate position detected by said detecting of the coordinate position in (b) is moved outside said first operation effective area, said second operation effective area, and the middle area, and further includes
(g) canceling the effective state setting of the key by said key effective state setting in (f) when it is determined that said coordinate position is moved outside said first operation effective area, said second operation effective area, and said middle area by said determining of the coordinate position in (e), wherein said changing of the game image in (d) does not change said game image when the effective state setting of the key is canceled by said canceling of the effective state setting in (g).

17. A game controlling method according to claim 16, wherein said canceling of the effective state setting in (g) cancels the effective state setting to the key by said setting of said first key and second key in (f) after it is determined that said coordinate position is included in one of said first operation effective area and said second operation effective area by said determining of the coordinate position in (c), and when it is detected that the operation input to said touch panel is shifted from the operation-present state to the operation-absent state by said detecting of the presence or absence in (a).

18. A game controlling method according to claim 13, wherein said display portion includes a first display area for displaying a first game image and a second display area for displaying a second game image including said first key and said second key, and said changing of the game image in (d) changes both of said first game image and said second game image.

* * * * *